(12) United States Patent
Bergamo et al.

(10) Patent No.: US 12,099,971 B2
(45) Date of Patent: Sep. 24, 2024

(54) SYSTEM AND METHOD FOR LIVE INFORMATION CONSTRUCT AND INTEGRATED AND COLLABORATION PLATFORM USING THE SAME

(71) Applicant: Two Six Labs, LLC, Alexandria, VA (US)

(72) Inventors: Giacomo Bergamo, Alexandria, VA (US); Stephen Josiah Halasz, Alexandria, VA (US); Douglas Stephen Kurucz, Centerville, VA (US); Sean Michael Kosanovich, Mckees Rocks, PA (US)

(73) Assignee: Two Six Labs, LLC, Arlington, VA (US)

( * ) Notice: Subject to any disclaimer, the term of this patent is extended or adjusted under 35 U.S.C. 154(b) by 76 days.

(21) Appl. No.: 17/435,792

(22) PCT Filed: Jan. 22, 2021

(86) PCT No.: PCT/US2021/014716
§ 371 (c)(1),
(2) Date: Sep. 2, 2021

(87) PCT Pub. No.: WO2021/150961
PCT Pub. Date: Jul. 29, 2021

(65) Prior Publication Data
US 2022/0351140 A1    Nov. 3, 2022

Related U.S. Application Data

(60) Provisional application No. 62/964,328, filed on Jan. 22, 2020.

(51) Int. Cl.
*G06Q 10/10*    (2023.01)
*G06F 16/21*    (2019.01)
*G06F 21/62*    (2013.01)

(52) U.S. Cl.
CPC ............ *G06Q 10/10* (2013.01); *G06F 16/21* (2019.01); *G06F 21/6218* (2013.01)

(58) Field of Classification Search
CPC .. G06Q 10/10; G06Q 10/103; G06F 21/6218; G06F 3/048
See application file for complete search history.

(56) References Cited

U.S. PATENT DOCUMENTS

| | | | |
|---|---|---|---|
| 10,541,825 B2* | 1/2020 | Jin | G06F 3/04817 |
| 2004/0261013 A1* | 12/2004 | Wynn | G06Q 10/10 |
| | | | 715/201 |

(Continued)

OTHER PUBLICATIONS

Bassanino et al. "Can virtual workspaces enhance team communication and collaboration in design review meetings?" Architectural Engineering and Design Management 10.3-4 (2014): 200-217. Mar. 6, 2013 (Mar. 6, 2013) Retrieved on Mar. 14, 2021 (Mar. 14, 2021) from entire document.

(Continued)

*Primary Examiner* — Ryan F Pitaro
(74) *Attorney, Agent, or Firm* — Armis IP Law, LLC

(57) ABSTRACT

The present teaching relates to method, system, medium, and implementations for unfragmented information management. A live information construct (LIC) represents a component for unfragmented management of information associated with the component. The LIC comprises a document space, a control space, and a work space. The document space includes documents representing a plurality aspects of the component in an unfragmented manner. The control space includes control configurations, each of which defines some communication channels used by a party to manage relevant information in the document space with limitations to be imposed on the at least one communication channel. The work space provides embedded tools accessible to a (Continued)

party for managing the relevant information in the LIC via the at least one communication channel within the confine of the limitations.

23 Claims, 33 Drawing Sheets

(56) References Cited

U.S. PATENT DOCUMENTS

| | | | |
|---|---|---|---|
| 2006/0031340 A1 | 2/2006 | Mathew et al. | |
| 2009/0177754 A1* | 7/2009 | Brezina | H04L 67/306 |
| | | | 709/206 |
| 2011/0047221 A1* | 2/2011 | Watanabe | G06Q 10/10 |
| | | | 709/228 |
| 2020/0257656 A1* | 8/2020 | Johnston | G06Q 10/10 |
| 2021/0011649 A1* | 1/2021 | Doshi | G06F 3/0604 |
| 2021/0097120 A1* | 4/2021 | Gutierrez | G06F 16/14 |
| 2021/0126805 A1* | 4/2021 | Archer | G06F 3/0481 |
| 2021/0126880 A1* | 4/2021 | Nair | H04L 51/10 |
| 2021/0258401 A1* | 8/2021 | Sullivan | H04W 4/08 |
| 2021/0344622 A1* | 11/2021 | Mann | G06Q 10/06313 |
| 2023/0072246 A1* | 3/2023 | Kirchhof | H04L 67/75 |
| 2023/0214780 A1* | 7/2023 | Fong | H04L 65/4015 |
| | | | 705/7.18 |

OTHER PUBLICATIONS

International Search Report, PCT/US2021/014716, pp. 2.

Ishii et al. "Integration of interpersonal space and shared workspace: ClearBoard design and 1-22 experiments." ACM Transactions on Information Systems (TOIS) 11.4 (1993): 349-375. Oct. 1993 (Oct. 1993) Retrieved on Mar. 14, 2021 (Mar. 14, 2021) from entire document.

* cited by examiner

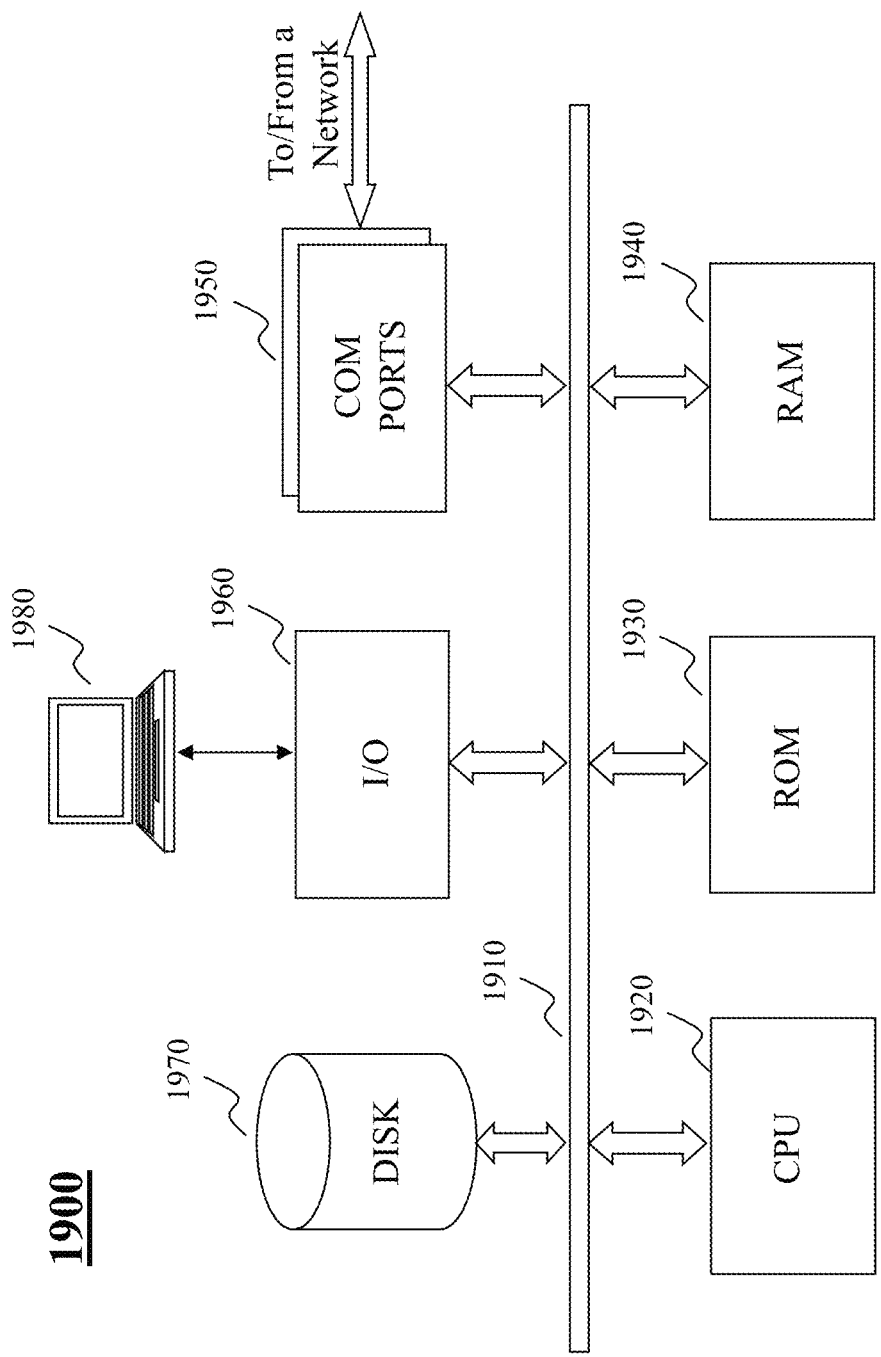

SYSTEM AND METHOD FOR LIVE INFORMATION CONSTRUCT AND INTEGRATED AND COLLABORATION PLATFORM USING THE SAME

CROSS REFERENCE TO RELATED APPLICATIONS

This application claims priority to PCT Application No. PCT/US21/14716, filed Jan. 22, 2021, which claims priority to U.S. Provisional Patent Application No. 62/964,328, filed Jan. 22, 2020, which is herein incorporated by reference in its entirety.

BACKGROUND

1. Technical Field

The present teaching generally relates to computer. More specifically, the present teaching relates to information management.

2. Technical Background

In today's society, because of the ubiquitous presence of network connections and the availability of massively available electronic information, more and more types of work are done via digital connections and forms. While much of the information nowadays can be accessed and consumed in a manner that is a click away, the need to find relevant information associated with some coherent needs may have become more challenging because often times information available in the digital world may be scattered around the networked world without effective organization. That is, although readily accessible, the online information is quite fragmented. The voluminous nature of such fragmented information in a digital world makes it even more challenging to users who desire to access and manage relevant information in a coherent and integrated manner. At the same time, the conventional world managed based on offline documents is still presently operational and information recorded via offline documents is even more fragmented. The combination of both the fragmented online and offline worlds presents even higher challenges to information consumers and businesses or organizations that rely on information in their operations.

For example, for centuries, supply chains in the commercial world have operated in a fragmented manner. Traditionally, a supply chain may comprise suppliers of raw materials, parts, sub-components, components, products, systems, applications, distributors, and after-sale service providers. Broadly defined, a supply chain may also include certain $3^{rd}$ party service providers such as financial institutions, accounting firms, legal services, etc. That is, a supply chain may include entities in different industries or in different sectors of such industries.

An example of a traditional supply chain related to a drone manufacturer 110 is illustrated in FIG. 1. The example drone manufacturer 110 may be engaged in activities related to making a drone product and involve different parties. As illustrated, the drone manufactured by 110 may use different components such as wings 120-1, motors 120-2, . . . , or cameras 120-3, which may be respectively supplied by different vendors in the marketplace with respective different sets of documents describing the supplied products and providing various parameters related to the supplied components. Besides receiving information from different suppliers of components, the drone manufacturer 110 may also involve other parties either within its own organization or outside of its organization. For instance, as shown, in connection with manufacturing a drone product, the drone manufacturer 110 may work with some financing entity 130-1 such as a bank to finance certain commercial activities. The drone manufacturer 110 may also work with outsourced engineering vendors 140-1 to, e.g., provide certain designs associated with the drone product. Within the organization of the drone manufacturer 110, there may be marketing team 150-1 that engages in marketing the drone product based on product information. Similarly, to support the commercial activities associated with the drone product, the accounting department 160-1 of the drone manufacturer 110 may also engage in collaborations as a team for the drone product.

In addition to the parties directly linked to the drone manufacturer 110, there may also be secondary associated parties that are also included in the supply chain of the drone product. As illustrated, the manufacturer of cameras 120-3 may also operate based on information related to sub-components, e.g., 170-1, 170-2, . . . , 170-3, used to make the cameras used in the drone product and such information related to the sub-components may also impact the production activities associated with the drone product. For example, when the design parameters related to sub-components of a camera used in the drone product changes, it may impact how the drone is assembled. Thus, the drone manufacturer 110 also needs to access information of the sub-components of the camera it uses. Similarly, the manufacturer that supplies the motor 120-2 may involve other suppliers 180-1 on parts of the motor, who may further rely on information of sub-components of such parts 190-1, 190-2, . . . , 190-3 from additional suppliers. Also, the manufacturer of the motor may also involve its product team 180-2, in-house external financing organization 180-3, . . . or marketing team 180-4. Each and every one of these parties involved in the supply chain of the drone manufacturer 110, whether it is within the same company or outside of the company, collaborate based on documents, whether digital or physical, as shown in FIG. 1. Such a supply chain is effectively an information chain and any change in the information in this information chain may impact the drone manufacturer 110.

Different types of information to facilitate different aspects/stages of a supply chain may be created, exchanged, maintained, and communicated among different players when needed to trigger commercial events that need to happen in a supply chain. In some situations, information may also be created and communicated across different supply chains. Thus, the commercial world has always been known to be a massive web of social, physical, mental, and electronic interactions to conduct diverse types of activities via heterogeneous types of channels, manners, and forms. Millions of people are required to be engaged in this informational web to create, maintain, and update dynamically all the information needed by different parties in various commercial and production relationships via different communication channels and conduct the communication in heterogeneous forms, leading to severe fragmentation of information and making the management of commercial activities inefficient, tedious, and often incoherent.

With the emergence of the Internet and the ubiquitous connectivity, more applications have been developed to provide platforms for different parties to share and manage information. However, such traditional platforms are conventionally industry, sector, or even entity specific, i.e., they still do not provide a coherent platform that allows parties in supply chains involving different industries and industry sectors to share/manage information relevant to supply chains in a non-fragmented and coherent manner. That is, although the information or documents relevant to a certain commercial project, such as drone manufacturing and marketing, may be accessible from all parties involved, as such documents are stored and managed completely segregated, scattered, and fragmented, it is difficult to effectively identify relevant information to manage corresponding commercial activities in an un-fragmented and coherent manner.

Thus, there is a need for methods and systems that allow more effective solutions to address the shortcomings and challenges of the traditional approaches.

SUMMARY

The teachings disclosed herein relate to methods, systems, and programming for information management. More particularly, the present teaching relates to methods, systems, and programming related to unfragmented and integrated information management.

In one example, a method, implemented on a machine having at least one processor, storage, and a communication platform capable of connecting to a network for unfragmented information management. For each of a plurality of components, a live information construct (LIC) is generated to represent the component. The LIC comprises a document space, a control space, and a workspace. The document space includes documents representing a plurality of aspects of the component. The control space includes control configurations, each of which defines at least one communication channel used by a party to manage information in the document space with limitations imposed on the at least one communication channel. The workspace includes embedded tools for managing information in the LIC via communication channels associated with different parties. When a request is received from a requesting party to invoke one of the embedded tools for managing information in the LIC, the invoked tool is instantiated for the requesting party based on a control configuration associated with the requesting party with one or more limitations that the invoked tool is to comply.

In a different example, a system for unfragmented information management. A live information construct (LIC) is used to represent each component for unfragmented management of information associated with the component. Structurally, the LIC comprises a document space, a control space, and a workspace. The document space includes documents representing a plurality aspects of the component in an unfragmented manner. The control space includes control configurations, each of which defines some communication channels used by a party to manage relevant information in the document space with limitations to be imposed on the at least one communication channel. The workspace provides embedded tools accessible to a party for managing the relevant information in the LIC via the at least one communication channel within the confine of the limitations.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for unfragmented information management. When the data is read by the machine, it causes the machine to perform various steps. For each of a plurality of components, a live information construct (LIC) is generated to represent the component. The LIC comprises a document space, a control space, and a workspace. The document space includes documents representing a plurality aspects of the component. The control space includes control configurations, each of which defines at least one communication channel used by a party to manage information in the document space with limitations imposed on the at least one communication channel. The workspace includes embedded tools for managing information in the LIC via communication channels associated with different parties. When a request is received from a requesting party to invoke one of the embedded tools for managing information in the LIC, the invoked tool is instantiated for the requesting party based on a control configuration associated with the requesting party with one or more limitations that the invoked tool is to comply.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 19 is an illustrative diagram of an exemplary computing device architecture that may be used to realize a specialized system implementing the present teaching in accordance with various embodiments.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
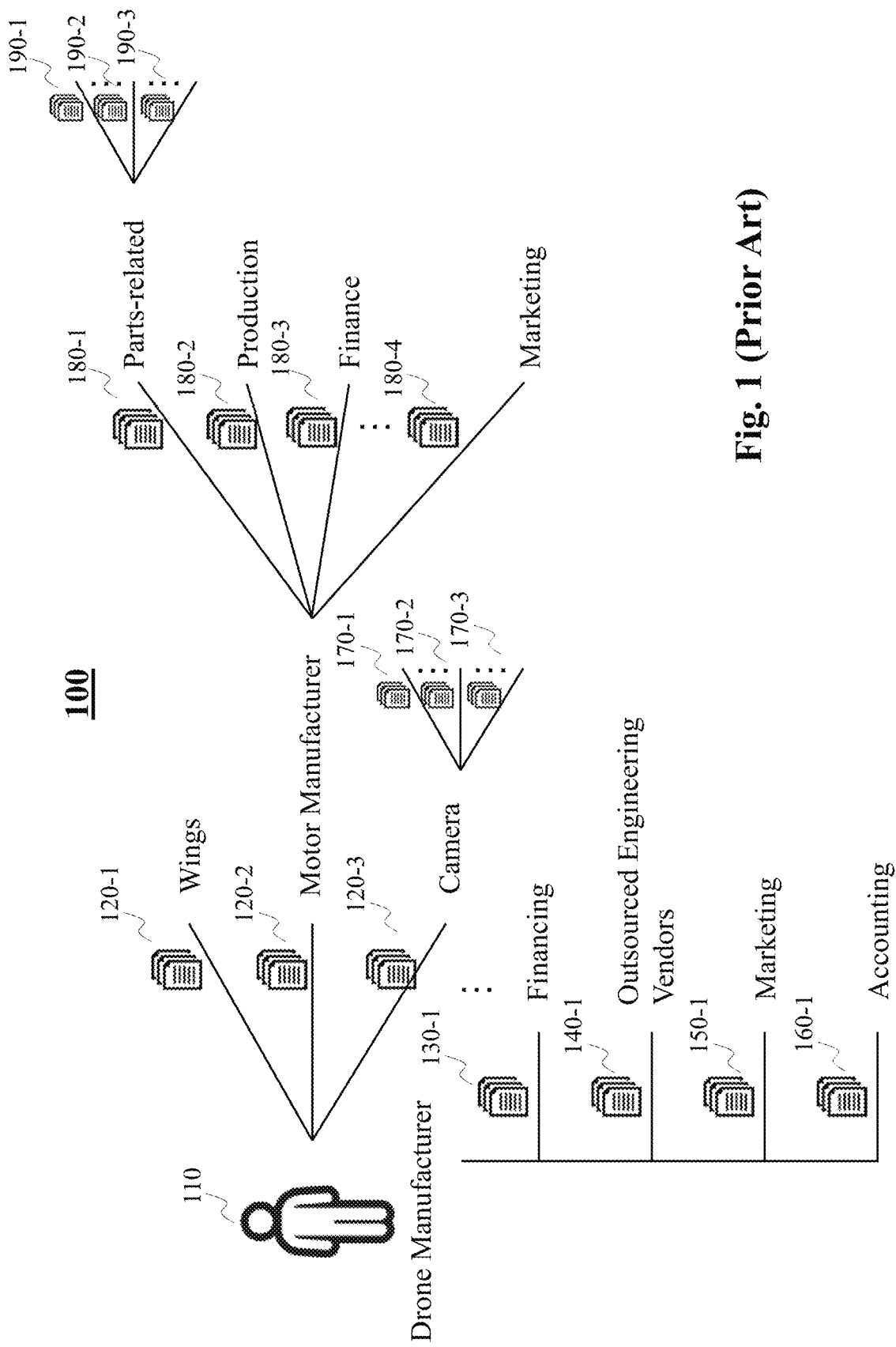
FIG. 1 (PRIOR ART) depicts an exemplary supply chain with fragmented information related to different parties scattered in a fragmented manner.
Figure 2:
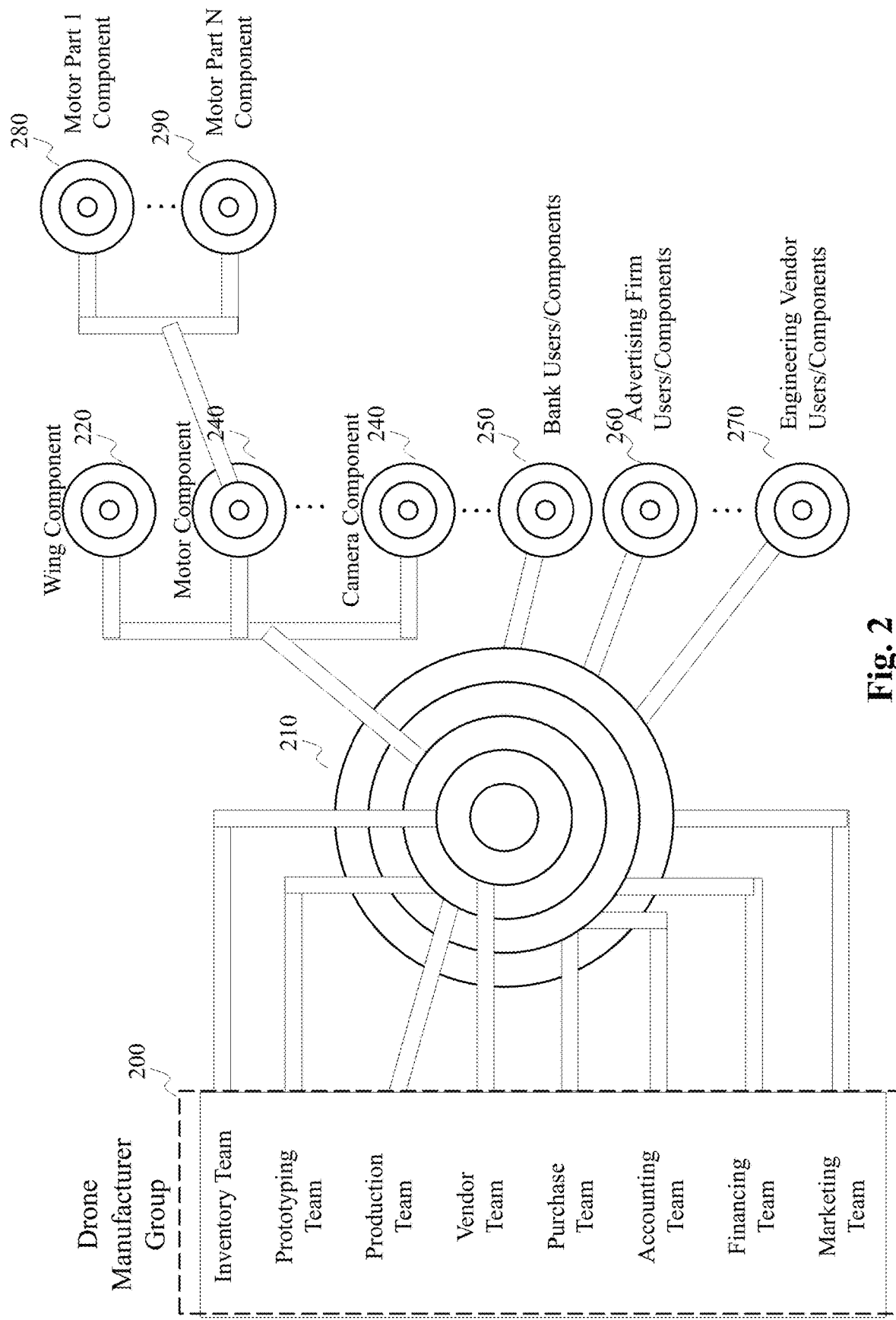
FIG. 2 depicts an information chain for unfragmented information sharing/management via live information constructs (LIC), in accordance with an exemplary embodiment of the present teaching.

The present teaching aims to improve the current state of the art in information sharing and management based on a smart and live information construct (LIC) for unfragmented information storage, access, and linking as well as an information access hierarchy where LICs reside at different layers and a service engine therefor, enabling participants of different entities, sectors, industries to contribute, organize, linking, and accessing relevant information in an unfragmented and coherent manner. To avoid the fragmentation of information as illustrated in FIG. 1 (PRIOR ART), FIG. 2 depicts an information chain for an unfragmented information sharing/management scheme via live information constructs (LICs), in accordance with an exemplary embodiment of the present teaching. As illustrated, a group 200 of participants from the drone manufacturer 110 includes all parties that need to access information in different facets or aspects associated with a drone product, including, e.g., an inventory team, a prototyping team, a production team, a vendor team, a purchase team, an accounting team, a financing team, . . . , and a marketing team, as shown in FIG. 2. Members of this group may include both participants internal to the drone manufacturer 110 (e.g., prototyping team, purchase team, accounting team, etc.) and external (e.g., vendor team, financing team, etc.). All information associated with the drone product is organized in a LIC 210 that may have a layered structure with different aspects of information attributed by different participants and organized in a logical manner with version control, embedded with tools that can be used to create, access, manipulate, and update information stored therein. Different information in the LIC 210 may be protected with different access rights assigned thereto and defined either by a creator of the information or by a member of the group.

Information captured in the LIC 210 may be accessed by different participants. As illustrated, different members of the LIC 210 may access information captured in the LIC 210 and each may access information that is relevant or meaningful to the role the member plays in the drone product. For instance, members in the prototyping team may access information related to components used to build the drone product; while members of the financing team may access information captured in the LIC 210 on the cost of components, production, marketing, etc. in order to work on, e.g., obtaining necessary financing to support the production and marketing of the drone product. Members of the purchase team may access information about the production status and inventory status for various components used in the drone product in order to schedule purchase and shipment of various components from suppliers.

Other participants may also access information captured in the LIC 210, including retrieving, adding, and modifying information, by other related participants. For example, any participants who are interested in purchasing the drone product may also access certain information residing in the LIC 210; any bank that is interested in providing a loan to the drone manufacturer 110 may access relevant financing related data in LIC 210, a component vendor such as one that provides cameras to the drone manufacturer 110 may access, including retrieving, adding, and modifying, information in LIC 210. As such, all aspects of information related to the drone product are captured in LIC 210 and any update of any pieces of information stored therein may be captured. Such information is also version controlled. In addition, not only information may be consolidated in such a manner, but also tools that can be used to control and manage the information are provided as embedded tools of the LIC 210 so that any update to any aspect of the information related to the drone product may be realized by interfacing with the LIC 210. In this manner, the information related to different aspects of the drone product are now no longer fragmented and scattered.

In addition, as will be presented below, the LIC 210 also provides embedded tools allowing linking it to other relevant LICs. As illustrated in FIG. 2, for example, as the drone product uses different components, the LIC 210 representing the drone product may link to, e.g., LICs representing a wing component 220, a motor component 230, . . . , and a camera component 240, which also store, respectively, unfragmented information related thereto. Such linked LICs may also link to additional LICs, e.g., the motor component LIC 240 may link to LICs 280, . . . 290, representing different components that the motor 240 uses storing unfragmented information associated with different aspects of different parts of the motor 240. Thus, not only the information related to all aspects of the drone product are now captured in LIC 210 in a unfragmented fashion, any other information from associated with to remotely related to the drone product can now be accessed in a unfragmented way. Comparing to what is shown in FIG. 1 (PRIOR ART) where documents associated with the drone product are stored and maintained in a scattered and fragmented manner, the present teaching enables a coherent and persistent way to maintain and access information along an information chain formed via linked LICs as shown in FIG. 2.

Figure 3:
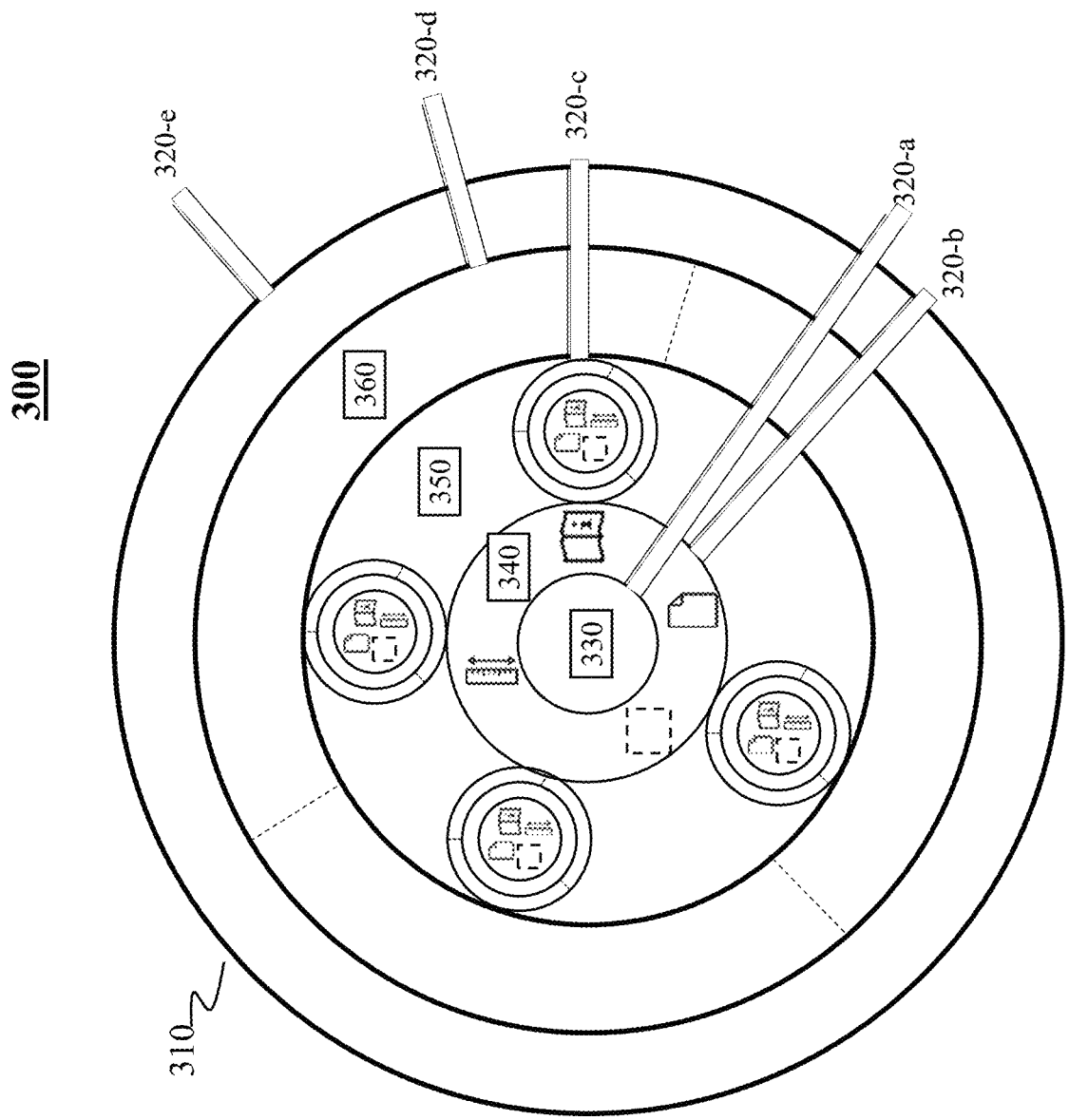
FIG. 3 depicts an exemplary conceptual organization of a LIC, in accordance with an exemplary embodiment of the present teaching.

FIG. 3 depicts an exemplary conceptual organization 300 of a LIC, in accordance with an exemplary embodiment of the present teaching. In this exemplary conceptual organization of a LIC, there is a layered structure of information. The exemplary LIC 310 represents a component with layers of information that make up different aspects of the component. For example, there are communication and access channels to each layer (320 *a-d*) in some embodiments. Creators of a component may have access (320-*a*) to edit all of its core characteristics and control its visibility to other users and groups (330). The creators of a component may also have access (320-*b*) to add/edit/remove additional properties, files, measurements, notes, and any other objects or concepts as part of the component specification and control their visibility in a fine-grained manner (340). As part of the specification of component 310, its creators may also create additional components or add any other products/components in the system as subcomponents (350). Each subcomponent can be mutated or transformed as part of being composed with the component 310 in the context of 310. When using others' components as subcomponents, the creators of 310 may have access to editing the mutations/transformations while the creators of each subcomponent can maintain control over its visibility (320-*c*). Groups with the appropriate permissions (320-*d*) have access to attaching their own characteristics, operations, and views (360) to the component 310 and may specify the visibility of their layer of information to other users and groups. Each individual user with the appropriate permissions (320-*e*) may have access to adding their own annotations, characteristics, and operations to the component 310, may have their own views of it, may control the visibility of their added information, and may use it as a subcomponent when creating a new component.

The layered structure of a LIC enables different players or participants to interact with appropriate layers when needed to facilitate different tasks involved in their product cycle. This may include from the initial stage of product research based on information available to product design, inventory control, finance management, product prototyping, product testing, product marketing, product sale, accounting, after-sale customer services, and other continued product generation updates, etc. Each group may include different business entities and personnel from such entities with designated tasks involved in the product life cycle.

Figure 4:
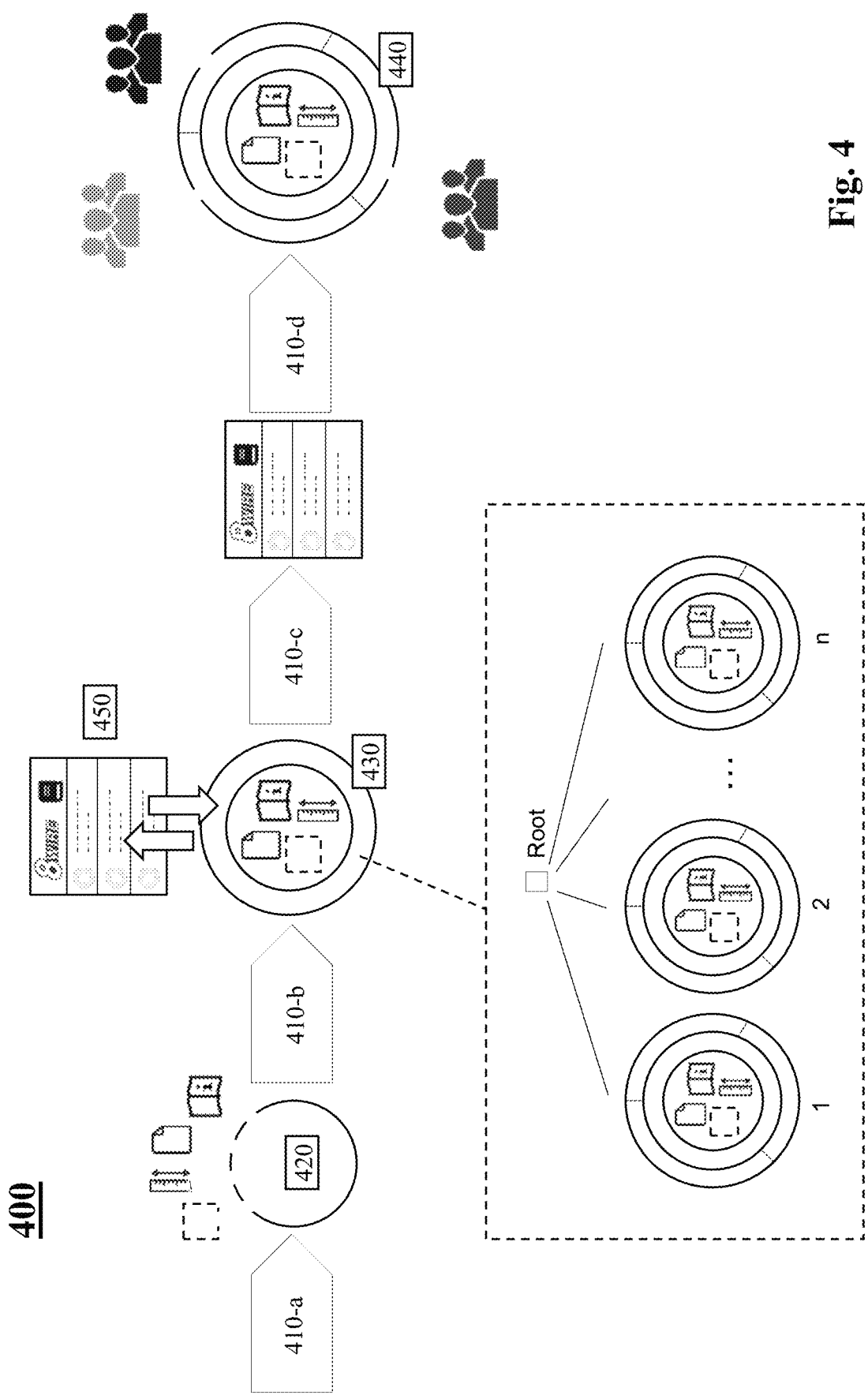
FIG. 4 shows an example of an information construction chain via LICs, in accordance with an exemplary embodiment of the present teaching.

FIG. 4 shows an example of information construction chain via LICs by different participants of a product life cycle, in accordance with an exemplary embodiment of the present teaching. In this illustration, it shows an exemplary information construction flow 410 *a-d* for constructing components/products based on available sub-components/components provided by other participants and represented as LICs. When a user creates a new component, he/she may specify (410-*a*) different core characteristics, properties, files, etc. associated with the component (420) as desired and then can define (410-*b*) a complex product (430) by describing additional subcomponents or searching a catalog of components (450), which may be presented as an interface via which a participant may find components made visible to him or her. When importing an already extant product from the catalog (450) as a subcomponent, a participant may bring in all of the characteristics, operations, displays, etc. as unfragmented information of the sub-component that were captured from different groups of participants in the system. The visibility of the LIC for the sub-component may be enabled or shared by one or more groups that own the sub-component or any participant that created the LIC for the sub-component. A participant may also publish his/her product or component on a component-by-component basis to the catalog and specify which other participants or groups to be allowed to see it (410-*c*). Multiple groups may add (410-*d*) their own defined characteristics, operations, and displays associated with each published component (440-*d*). Each component may also be used as a subcomponent by any of the participants. All specifications of a component as well as group additions provided to further characterize the component may be updated at any time by any authorized participant.

Figure 5:
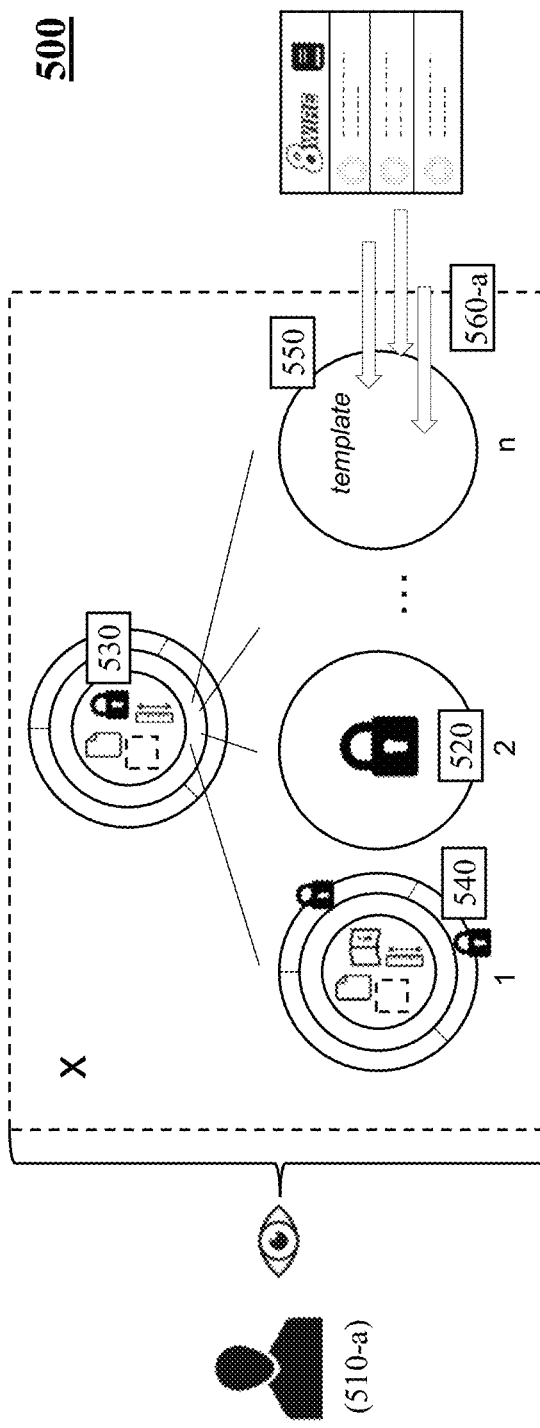
FIG. 5 illustrates use of LICs to provide an unfragmented information access chain, in accordance with an exemplary embodiment of the present teaching.
Figure 5:
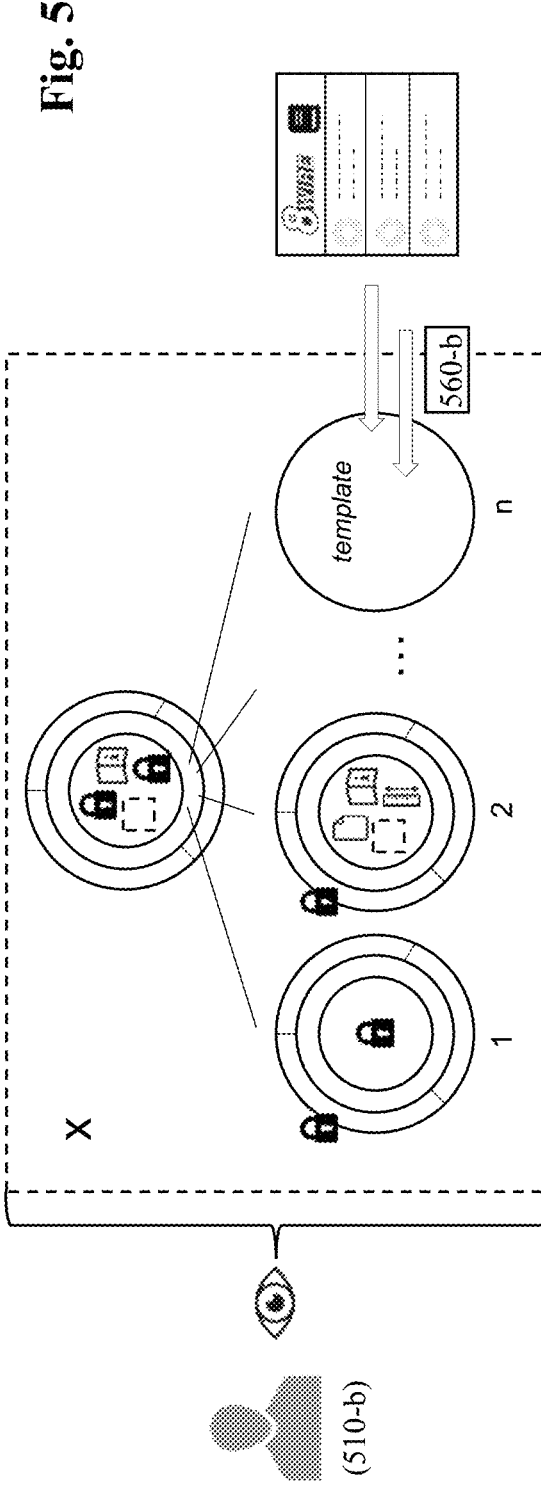

FIG. 5 illustrates the use of LICs to access an unfragmented information chain that provides visibility to different data to different users and groups, in accordance with an exemplary embodiment of the preset teaching. This figure illustrates how a LIC is provided to allow individualization of the same component by different participants (e.g., 510-*a* and 510-*b* in FIG. 5) in accordance with their respective permissions and needs. Certain subcomponents in a component may be made inaccessible to some users (520), different elements in a component may be made unavailable or displayed differently (530), and the accessibility to characteristics, operations, and views added by different groups of participants may also change depending on the user (540). Some components (550) may pull different results (560-*a* and 560-*b*) from the catalog to show to different users as well.

Different participants may be related to each other and they may form a supply chain so that different aspects of information related to the supply chain of a product may be provided, maintained, managed, and used to conduct different aspects of business operations. Via an information access chain following the linked LICs representing component-to-component relationships, it enables an all-in-one, domain-agnostic cloud-hosted collaboration platform, framework, and marketplace that facilitates the development of projects from conceptualization to deployment and sales. This platform via LICs solves the issues of information overload and fragmentation via its design and functionality, and allows users to work individually, with other users, within and across groups, all while using coherently managed information.

Figure 6:
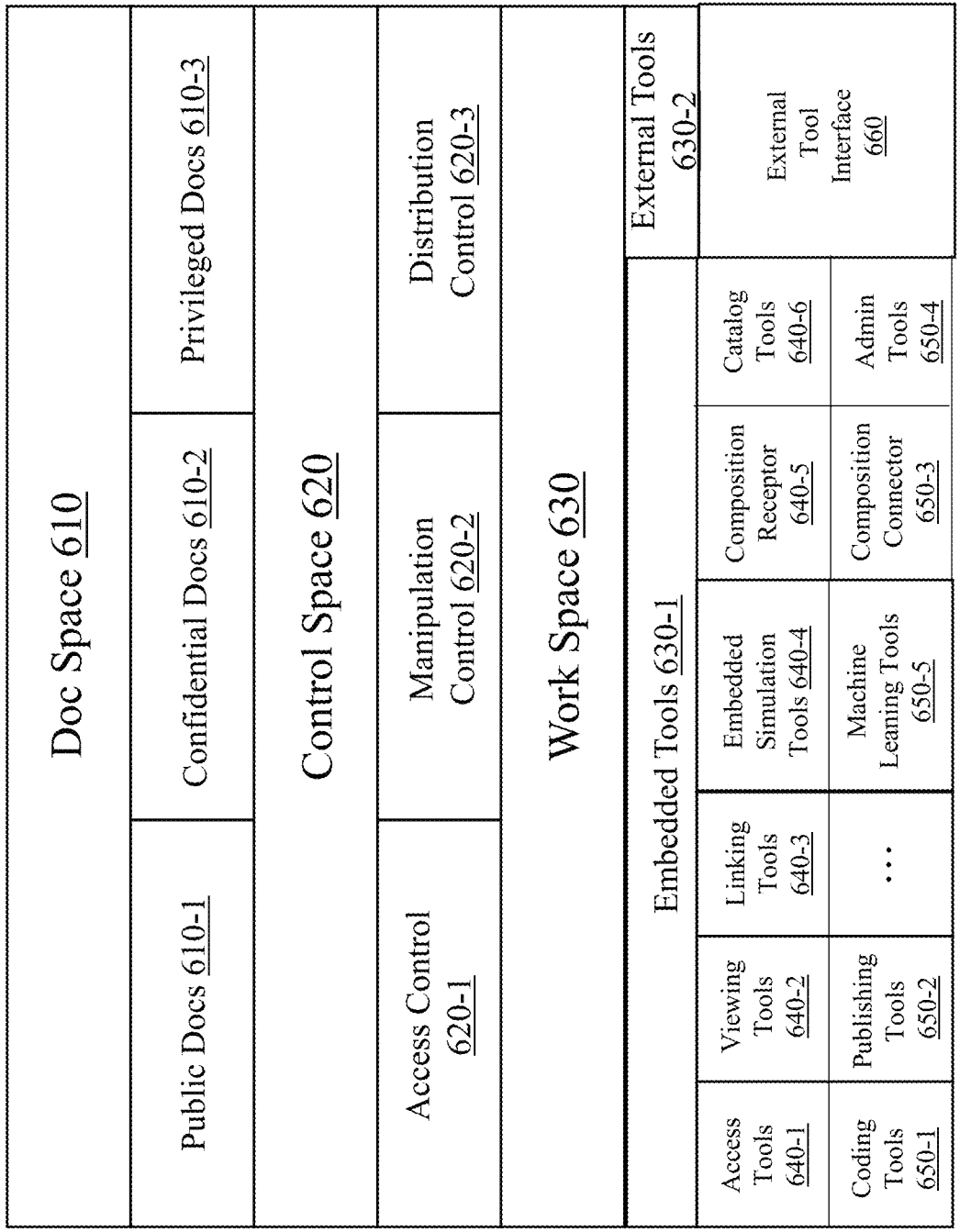
FIG. 6 depicts an exemplary internal organization of a LIC, in accordance with an exemplary embodiment of the preset teaching.

FIG. 6 depicts an exemplary internal organization of a LIC, in accordance with an exemplary embodiment of the preset teaching. In this illustrated embodiment, a LIC may be constructed with a plurality of inter-related spaces, including a Document Space 610, a Control Space 620, and a Work Space 630. The Document Space 610 may comprise different types of files or documents that can be uploaded. The LIC may also include data and metadata to be associated with relevant documents or the LIC, which may be entered by a creator of the LIC. The Work Space 630 may include various embedded tools that may be used by a user who accesses the LIC to perform certain operations. The Work Space 630 may also provide embedded tools that enable a user to connect external tools with the LIC in order to, e.g., carry out certain data manipulation or perform certain analysis of the data stored in the LIC using such external tools. To control access rights as applied to the data/documents residing in the Doc Space 610, the Control Space 620 may be used to host various control mechanisms as intermediary layer through which the tools in the Work Space 630 may be used in a way to comply with certain access right control.

In this exemplary organization of a LIC, the Document Space 610 may include different types of documents, including, e.g., public documents 610-1, confidential documents 610-2, . . . , and privileged documents 610-3. The access to each category of documents may be controlled by certain access permission controls. As their names may imply, the access to documents, data, and metadata included in the public docs 610-1 may impose fewer restrictions and allow access by any user. Examples of such public documents may include, e.g., a marketing brochure about a component made available for sale to the public. The access to documents, data, or metadata included in the confidential docs 610-2 may be restricted to those users who have entered into, e.g., some form of confidentiality agreement. Similarly, access to documents, data, or metadata included in the privileged docs 610-3 may be restricted to those users who are in a privileged relationship with the creators of the documents, data, and metadata to be accessed.

The files, documents, data, and metadata residing in the LIC may be automatically updated by processes in the overall LIC system (e.g., a view tracking operation or a machine learning task) or manually updated by any user or process with appropriate access and manipulation permissions. In some embodiments, one characteristic of LICs is that different user groups can define different properties and processes at a global level that are relevant to them along with required documents (e.g., an engineering test team may care about ISO waterproofing levels while a finance group may care about contract state for the same product described in a LIC). Any data and documents resulting from running those processes and setting those properties on a LIC are also stored in the Document Space 610 of the LICs, making LICs live constructs that can be augmented as needed by different users based on their own needs within the access rights assigned to them. The items in the Document Space 610 can be compartmentalized into various access levels such as Public, Confidential (or Classified in government contexts), and Privileged via controls stored in the Control Space that are manipulated using integrated tools in the Work Space.

Examples of files that can be uploaded to a LIC include code files, 3D and 2D design files from third party applications, images and videos in common web-viewable formats, Portable Document Format (PDF) files, and any other files from third party applications. Examples of data that can be entered with integrated tools include a LIC's title, version, description, category being described by the LIC, comparable metrics given the category (e.g., size, weight, speed, etc.), comments, notes, and any number of instruction sets and steps. In instruction sets and steps for a LIC, a user can associate files, refer to other instruction sets and steps, and describe required materials, tools, and prerequisite LICs. Importantly, part of the definition of a LIC is what other LICs it includes as subcomponents. These subcomponent composition connectors defining what LICs they connect to and the granularity of specification (e.g., a specific version of a LIC, any version of a LIC, any of a set of LICs, or any LIC known by the system meeting certain criteria) are also data captured in a LIC's Document Space.

Files and data in the Document Space 610 of a LIC can be automatically uploaded, updated, or deleted by external or embedded tools with the appropriate access and manipulation permissions as defined in the Control Space. As an example, if a LIC is being used to fully describe a drone product and a user group has not only viewing access to the LIC but also manipulation access to update certain areas of its Document Space and permission to hook in an external simulation tool, it could automatically update or verify stated performance metrics stored in the Document Space with the simulation results. As another example, if embedded or externally attached machine learning algorithms using the LIC data determine incompatibilities between LICs, failure and success conditions, suggestions, etc., these results are stored in the Document Space and accessible given controls stored in the Control Space. Examples of metadata captured in a LIC include all parent LICs in which it is embedded as a subcomponent at any level, how often it is accessed and by whom, and all changes performed and by whom.

It is important to note that because files, data, metadata, and subcomponent connectors stored in a LIC Document Space can be overlaid with different access controls, the LIC system allows different users to view the same item that holds information in an unfragmented manner but see different documents and connections to different subcomponents. It also means that the same LIC specification can be replicated across several instances of the system and the backing files and data need not be the same across these instances if the users with access to the different instances do not have access to the same data and files. The LIC specification effectively decouples data (stored in files or databases) from the relationships between data and user permissions to that data. For a specific example of how this is used, imagine a LIC system being used across classification domains in the United States government, which requires different air-gapped physical networks for data that is unclassified versus classified. With the LIC system, an engineering product (e.g., imagine a drone that can take different payloads) may consist of several subcomponent LICs that are unclassified and initially described in an unclassified LIC system. Those LIC specifications and the data backing their Document Spaces can then by migrated or merged into a classified instance of the LIC system. At that point, classified and unclassified data and files can be uploaded to the LIC Document Space and classified and unclassified LICs can be added as subcomponents via composition connectors.

Information stored in the Control Space 620 of a LIC stores the access controls and classification level of the files, data, and connectors to other LICs. The LIC specification can then be seamlessly moved back to a lower classification level system without moving any classified data but also without losing the LIC specification that describes the structure of and linkages between data. A user in the unclassified system might then see that additional information exists in more highly classified systems and would be able to enter those systems to view the information.

As mentioned above, controls stored in the Control Space 620 of a LIC may regulate what users, groups of users, or processes have access to view and update not only a LIC as a whole but files, data, metadata, and connectors in the LIC Document Space. These controls can be updated by various tools in the LIC Work Space and largely fall into the categories of access controls 620-1, manipulation controls 620-2, and distribution controls 620-3. It is these controls that allow for different channels of access to different layers of a LIC while allowing the LIC to hold all relevant information about the item being described in an unfragmented manner. Access Controls specify whether or not a user may access a LIC and, if so, what information inside the Document Space is accessible. Access to a LIC may be allowed based on the interrelationship of characteristics of a LIC and characteristics of a user. For example, a LIC overall may be private or published. If published, it may be published to all users of a LIC system, users that have purchased licenses (which may be timeboxed), users that have certain clearances, certain groups within the system, certain roles of certain groups, or certain distribution chains as controlled by distribution controls (e.g., if a creator of LIC allows users who include it as a subcomponent in their LICs to make it visible to anyone who can view those LICs). A user may have roles in one or more groups, may have certain clearances, and may have access to certain LICs via licenses or other permissions. The same permissions and user characteristics that control access to an overall LIC apply more granularly to individual files, data, metadata in the LIC Document Space. Access permission to documents can be controlled individually and also via document categories: If a user has access to a LIC overall then they have access to public documents, access to privileged documents only if they have the appropriate specified role or license, and access to confidential (or classified) documents only if their user profile matches the requirements for access and they are accessing the LIC in an appropriate environment.

Manipulation controls define what users and processes can not only access a LIC but also edit and update specific documents or categories of documents. Like access controls, manipulation controls are also based on the interrelationship between permissions set on the LIC and specific parts of the Document Space and a user's characteristics. Based on these controls, the LIC's original creators and invited collaborators may be able to edit all files, data, and subcomponent LIC connectors in the Document Space or certain files and data or certain categories of information in the Document Space. Creators and collaborators may be specified as individual users, users with specific roles in specific groups, or even embedded and external processes with permission to generate and update data.

In some embodiments, information stored in distribution control 620-3 may regulate what users in what situations are allowed to propagate access to a LIC or certain documents or categories of documents within a LIC Document Space to other users with which the original LIC creators may have no relationship. For example, one distribution control may allow Group A to define that if it creates a LIC X and makes it visible to Group B, then Group B has permission to make LIC X visible to Group C if it defines a new LIC using X as a subcomponent and shares their new LIK with C.

The Work Space 630 of a LIC comprises all tools, embedded in the LIC system or connectable via external interfaces (e.g., an API for running a machine learning algorithm or simulation), that allow for updating of controls in the Control Space, changing how a LIC is displayed to a current user, and defining and updating data and documents in the Document Space. One example of an embedded tool is a graphical user interface that allows each user to customize what information they see related to each LIC. For example, a user that belongs to an engineering group might use this tool to specify they want to see data related to performance metrics of each engineering component LIC and the state of custom-defined safety testing processes that he is running specifically for his group. Another user from a group related to logistics might specify that, for each LIC, they want to see custom-defined properties related to the inventory count and inventory need predictions, as well as the current state of custom-defined resupply processes. Another example of an embedded tool is a graphical user interface that allows users to define these custom processes and properties for a group. A final example of an embedded tool is graphical user interface that allows a creator of a LIC to define the other groups to which he or she would like to publish the LIC, which files in the Document Space can be made visible with more granularity, and what the distribution rules are for groups to redistribute the LIC content.

As discussed herein, embedded tools in the Work Space 630 or any external tools interfacing with the LIC may access information residing in the Doc Space 610 by complying with the controls specified in the Control Space 620. In the exemplary embodiment as shown in FIG. 6, these may include different types of control, including the control over access of the information residing in the Doc Space 610 (620-1), the control over manipulation of the information residing in the Doc Space 610, and the control over how the information residing in the Doc Space 610 may be distributed.

As illustrated in FIG. 6, there are different types of embedded tools in the Work Space 630. For example, there may include access tools 640-1, viewing tools 640-2 (defining, e.g., user personalized presentation of data), linking tools 640-3 (e.g., linking a component associated with the LIC to other components or sub-components), simulation tools 640-4 (e.g., tools to be used to perform simulation on, composition receptor tools 640-5, . . . , and catalog tools 640-6 (e.g., to list the component represented by the LIC in a catalog for others to know what is available). Additional embedded tools may include coding tools 650-1 (e.g., specifying how to information accessed from the LIC is to be coded such as encryption scheme, etc.), publishing tools 650-2 (e.g., for specifying how the information stored in the LIC is to be published), composition connector related tools 650-3 (e.g., specifying composition sub-components and connectors thereof), or administration tools 650-4. The Work Space 630 may also include external tools 630-2 which may provide external tool interface means 660 to allow a user to hook up eternal tools that rely on, e.g., the information, documents, data, etc. from the LIC to perform various computational tasks and then provide the result back to the LIC to enrich the information residing in the LIC.

Such external tools may be for simulation, testing, analytics, or machine learning based on the accessed information and then provide the result back to the LIC. For example, a company may desire to use a component in a new product the company intends to produce and a user from the company may access the LIC representing the component to obtain relevant information in order to determine whether various characteristics of the component meet the requirements of the new product. The user from the company may also use parameters of the product accessible from the LIC to perform certain simulations under the conditions required by the new product to see if the component, when used in such conditions, will function well to yield expected performance. In this situation, a simulation tool may be hooked to the LIC via the external tool interface 660 so that the external simulation tool can access parametric data related to the component that are needed for the simulation and perform the simulation using the accessed information externally by the company in order to assess the suitability of the component for its new product. During the external simulation, the company may also alter the component parameters in such a way that the altered component parameters lead to satisfactory performance of the new product when the component with modified parameters deliver the desired result.

In some situations, there may be a feedback from the company to the LIC. For example, if a simulation result indicates that using modified parameters of the component, the company achieves some desired performance of the new product, the company may provide the modification to the original parameters of the component to the LIC in a way that the creator of the component may receive such information as a customization request from the company. Thus, via the external tool interface 660, a potential participant (the company in this example) may communicate with the creator of the component on a customization request. In addition, in some situations, the company may also store the simulation result in the LIC to share with other participants. In this way, different parties, including potential customers or independent evaluators of the component, may test, using their own proprietary tools external to the LIC via the external tool interface, the uses of the component in diverse situations (different products, different environments, etc.) and share such information (whether successful or not) with others about the component via the LIC.

Thus, the LIC as disclosed herein is live with dynamic updates and/or enrichment of information stored therein via either internally embedded tools or externally hooked tools by different users based on their respective ways to test, evaluate, and learn about the component from potentially a wide range of diverse situations, subject to corresponding limitations on access right, manipulation rights, and distribution rights assigned thereto. With such LICs, information related to a component/product/subcomponent represented by the LICs is kept in a unfragmented manner yet flexible enough for all who desire to access and view any information needed at any time in an unfragmented fashion. With the dynamic nature of information residing in a LIC, such information is enriched over time.

As discussed herein so far, LICs provide zero information fragmentation, can both include other LICs as subcomponents and be included in other LICs as their subcomponents. In addition, LICs provide configurable and access controlled channels for participants to access and update information. Furthermore, LICs embed internal analytical tools and support externally hooked tools for evaluating or assessing components represented by LICs. Because of these characteristics, LICs provide effective platforms for machine learning would likely not be supported with the same level of effectiveness in the traditional fragmented environments. The unified environment represented by each LIC and its connections to other LICs captures the multidimensional data needed for machine learning algorithms to learn and characterize insights associated with components/products/subcomponents/services that would otherwise be impossible. As shown in FIG. 6, the Work Space 630 of the LIC as illustrated may include various embedded machine learning tools 650-5 that may be utilized by users who access the LIC to perform machine learning based on information residing in the LIC or in other LICs connected therewith. For example, when users run simulations on the component represented by the LIC using different testing parameters or under different conditions, such simulation results may serve as training data for machine learning tools 650-5 embedded in the LIC to learn and characterize how the component may perform under different simulation conditions.

Although individual creators of LICs have control over what specific data can be seen by others, such LICs form, via connections among them, a complex networked information network with unfragmented information stored therein and continuous access chains based on characteristics of the LICs as disclosed herein. That is, the overall information network enabled by connected LICs allows users full access to all data via linkages. As such, information that can be accessed via such a fully connected information network provides an effective training data base to run machine learning algorithms that either residing in LICs or hooked with such LICs via their respective external tool interfaces. With such a training data base, such machine learning algorithms may be invoked to carry out big data analytics according to different needs and feedback the learning results to relevant LICs or even to their connected LICs, which further enriches the unfragmented information resided therein. Such machine learning results provide the LICs abstracted, generalized, or anonymized knowledge derived from an extended network of information beyond how each individual LIC is initially created. The abstraction and anonymization knowledge derived via machine learning results can be used to customize components represented by such LICs to meet different needs.

For instance, if LIC A represents a subcomponent used in n other parent LICs and some of those parent LICs also use LIC B as a subcomponent, and if enough of those parents capture data representing failures, either through reviews or simulation and analysis results, a machine learning algorithm could determine that A and B may not be compatible or under certain conditions, which may be learned and characterized via machine learning. For example, via machine learning, existence of certain conditions (e.g., subcomponent A and B being used below a certain temperature threshold) that correlate with failures may be recognized and extracted. The creator of LIC A may then be informed from the learning result that its corresponding component may be incompatible with some parent LICs, with specific parent LICs, and/or with LIC B, depending on the visibility preferences and channels that the creator of LIC A has into those other LICs. The same type of controlled notification could be provided to creators of parent LICs, who may or may not have LIC A as a child subcomponent many levels deep and not have a channel for full visibility into it, and the creator of LIC B.

As another example, imagine that the framework 800 as disclosed herein is used by many participants to create and define different drone products. In that process, the creators of such LICs provide some custom LIC subcomponents but also search for and add LICs made by others representing such things as motors, airframes, sensors, etc. When a user later specifies a new drone product LIC with subcomponent LICs, a machine learning algorithm may be used to determine, via learning based on enriched information, accessible from LICs connected in the information network, that the user is missing a category of subcomponent or that certain subcomponents are more commonly used together than the set that the user has chosen. The user could then be informed of these results, with result customization or anonymization as needed. That is, even though the user may not be aware of information in other LICs that forms the basis of the result presented via machine learning, the user may be prompted to add in or replace suggested subcomponent LICs.

As yet another example, machine learning algorithms, either embedded in LICs or externally connected to LICs, may be invoked to learn from data in LICs to provide auto-templating or even full auto-specification of products. Imagine that the LIC system has been used many times by different creators to specify different LICs of a particular category (e.g., a drone). By virtue of those different creators adding specific subcomponent LICs of different categories (e.g., motor, battery, navigation software, etc.), machine learning algorithms would allow the system to automatically learn what categories of subcomponents are required and which ones are optional when describing something of that category. The system would also learn the most commonly used specific LIC subcomponents, and which ones are most commonly used together, given any specified metrics in the parent LIC (e.g., a small and short flight duration drone would have both different required categories of subcomponents and different actual subcomponents than more larger ones that can fly further). As a result, when a user begins to describe a new LIC and specifies a category that has been learned, he or she could be automatically shown, based on preferences, a template for the other categories and quantities of subcomponent LICs that need to be chosen to complete the specification or full specifications of different subcomponent LICs that could be dropped in. Furthermore, machine learning could be automatically run on the documents, textual descriptions, metrics, etc. being entered by the user when defining a LIC to suggest the most appropriate category for it and then kick off the auto-templating or auto-specification of subcomponent LICs.

Figure 7A:
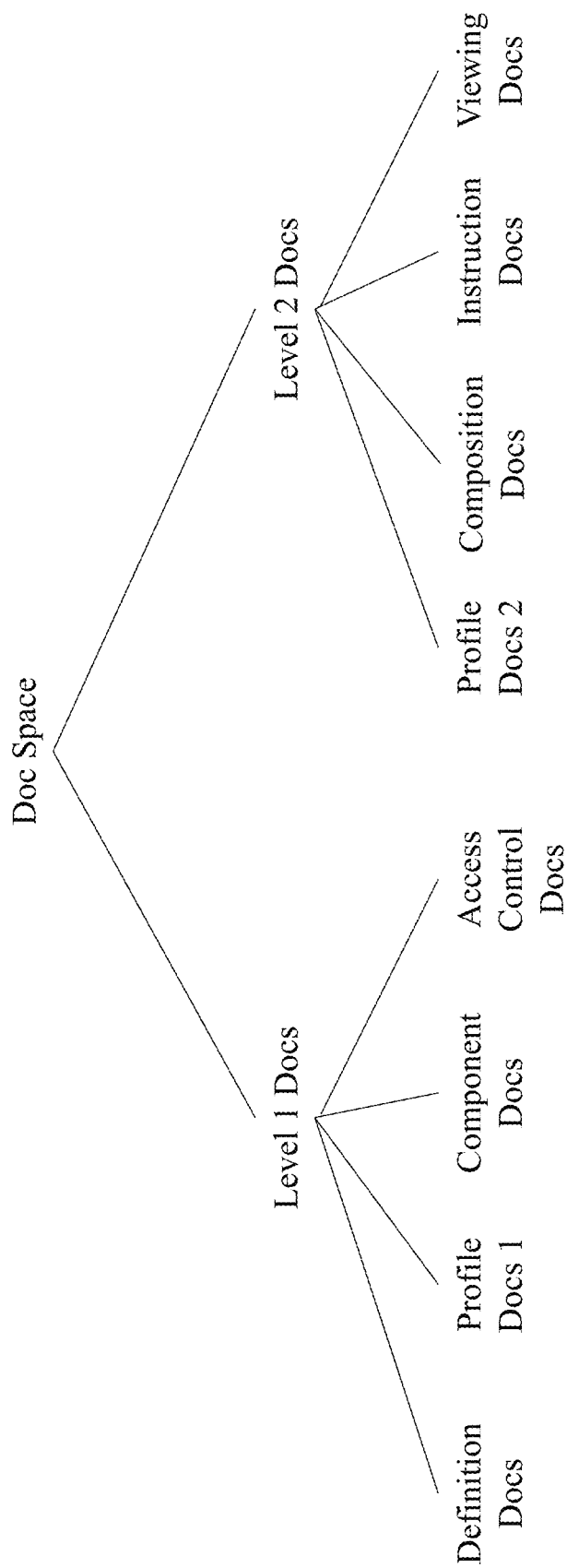
FIG. 7A illustrates exemplary types of documents and classification thereof residing in a document space of a LIC, in accordance with an exemplary embodiment of the present teaching.

As discussed herein, in the Document Space 610 of a LIC, various documents may be stored and accessed and different types of documents may be associated with different levels of classification such as public document, confidential document, or even privileged documents. Such documents may also be classified as one level having unrestricted access (e.g., public) and the other having restricted access (confidential and/or privileged). FIG. 7A illustrates exemplary types of documents residing in a LIC, in accordance with an exemplary embodiment of the present teaching. There are two levels of documents, namely level 1 and level 2, which may correspond to unrestricted and restricted classifications. Under each classification level, there may be a plurality of documents appropriate to that level. For example, if level 1 documents correspond to unrestricted class, i.e., the access of them are not restricted, certain documents related to the component represented by the LIC may be placed with the level one documents, such as the documents that define the component and features thereof (so that everyone can see), documents that define the profile of the creator of the component (e.g., the profile of the company that offer the component, etc.), documents about the component (e.g., detailed engineering papers about its design, prototyping information, and testing results, etc.), and documents that define the access control of the documents in this category (e.g., what it takes for a user to gain access or access steps, etc.).

At a level where the access is restricted, there may also be documents that provide different information to a group of users that are subject to a higher level of access control. For example, at this level, documents may be provided on instructions on how to assemble or used to run tests on the component, on viewing requirements of different users, on alternative compositions of the component required by different users based on their own needs, and on restriction profiles as applied to different users.

Figure 7B:
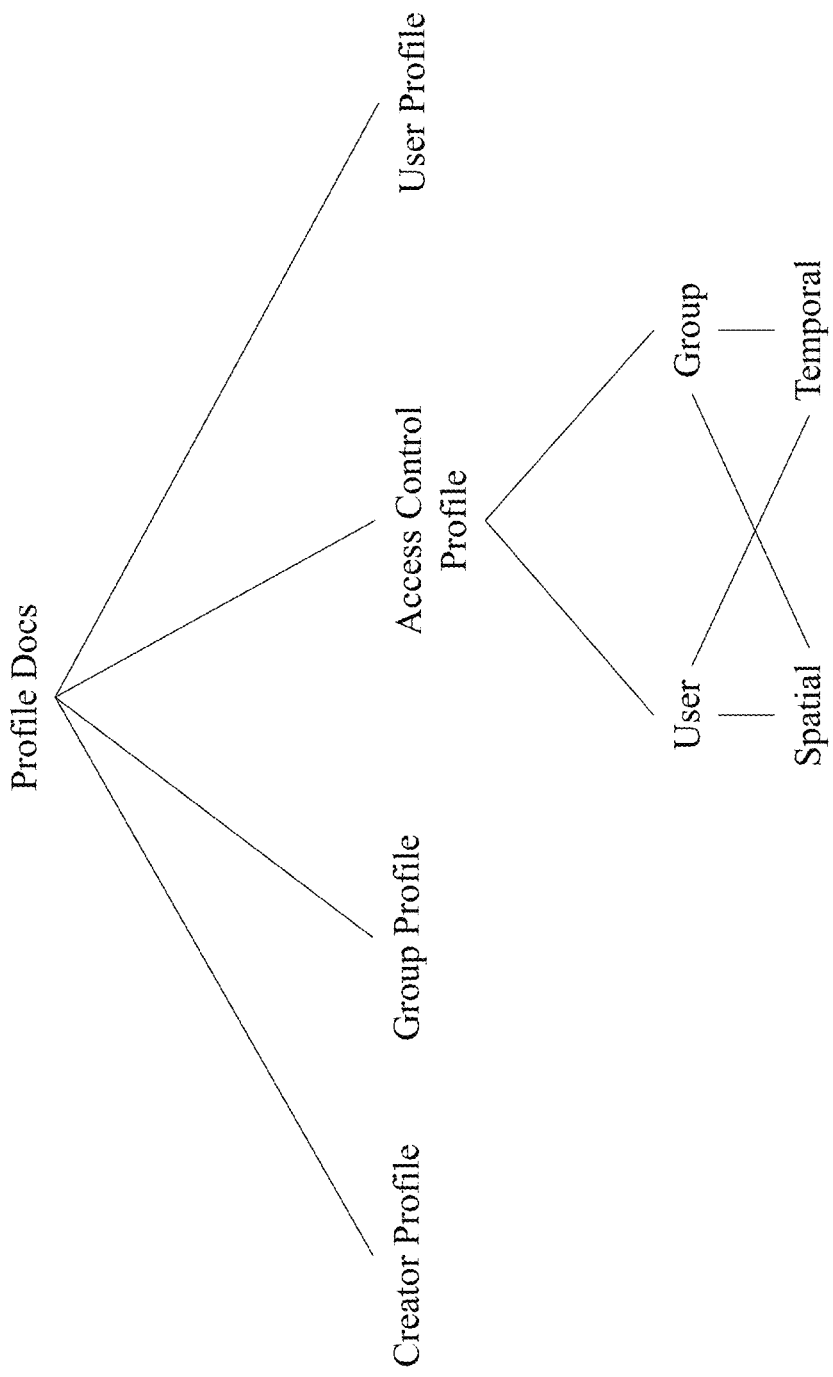
FIG. 7B illustrates exemplary types of profile related documents and organization thereof in a LIC, in accordance with an exemplary embodiment of the present teaching.

As discussed herein, there may be different ways to define users that access a LIC and for each user or a group of user, there may be different restrictions in terms of access, manipulation, or distribution. In some embodiments, restrictions on rights assigned to different groups or individuals who have access to an LIC may be described in different profile documents. FIG. 7B illustrates exemplary types of profile-related documents and organization thereof in a LIC, in accordance with an exemplary embodiment of the present teaching. Profile documents in a LIC may include a profile for the creator of the LIC or the component it represents, one or more group profiles each of which specifies the profile of a group, user profiles for individual users, and accompanying access control profiles as applied to individual users and groups. Such access control may be specified in terms of both spatial and temporal related conditions. Spatial restrictions may specify who in which group can access what. For example, if a group corresponds to a product related group (e.g., product is a drone) in which there are different group members each of which has a distinct role to play (e.g., an engineer is for product testing, an accounting person is for accounting of the product). As different users in the group have different roles to play, each user may be restricted to see only certain types of documents in the LIC representing a component used in the product. For instance, an engineer in the group may be allowed to access only technical documents and the accounting personnel in the group may be allowed to access only finance documents related to the product. Such restrictions may be spatial related restrictions.

Through profiles specifying access control one may also specify temporal restrictions. For example, a group may include both design engineers who are responsible for designing a product and test engineers who are responsible for testing products after manufacturing. In this case, there may be temporal restrictions to be applied to the testing engineers in the same group to define that such testing engineers may not be allowed to access certain documents until after (temporal condition) the design engineers finish their design.

Figure 7C:
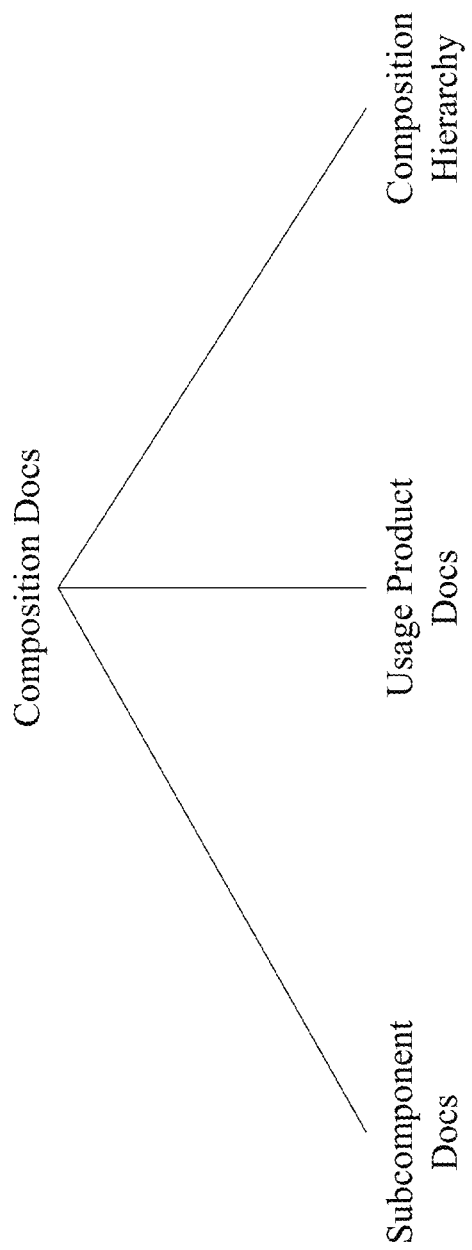
FIG. 7C illustrates exemplary types of composition documents and classification thereof in a LIC, in accordance with an exemplary embodiment of the present teaching.

FIG. 7C illustrates exemplary types of composition documents and classification thereof in a LIC, in accordance with an exemplary embodiment of the present teaching. A composition document is used to describe the construct involving a component represented by a LIC. In some situations, the component is used in a product as a component of that product and it can be specified in a usage product document. In other situations, the component is constructed using sub-components and such composition of the component may be specified in a subcomponent document. In some situations, composition hierarchy documents may also be provided that may specify both how the component is constructed using other sub-components and how the component is further being used in other components or products as a subcomponent.

Figure 7D:
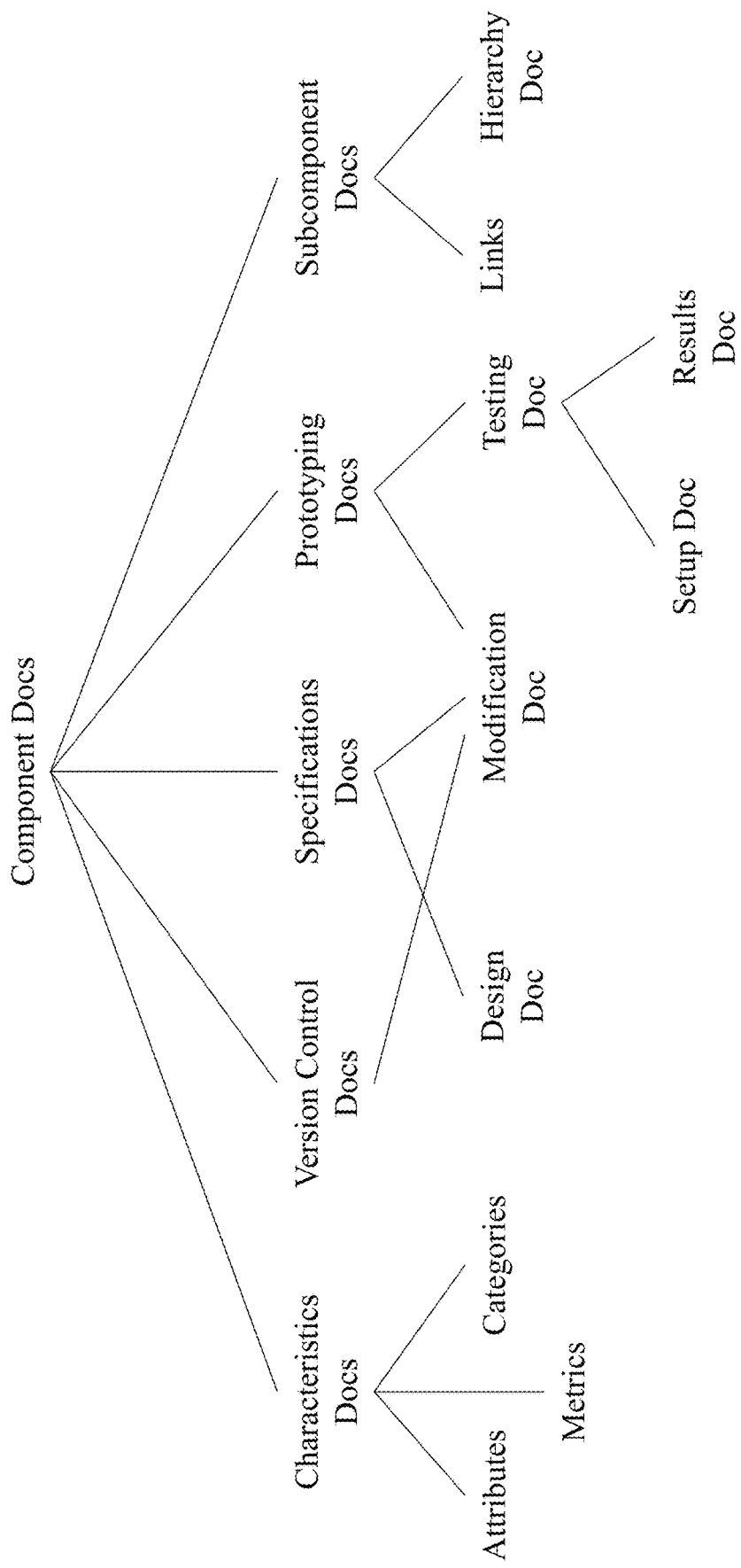
FIG. 7D illustrates exemplary types of component documents and classification thereof in a LIC, in accordance with an exemplary embodiment of the present teaching.

As discussed herein, in using a LIC to represent a component, an essential part of the documents residing in a LIC is component-related documents. FIG. 7D illustrates exemplary types of component documents and classification thereof, in accordance with an exemplary embodiment of the present teaching. A component may be described from different aspects including, as shown in FIG. 7D, its characteristics, its design, its prototyping specifications, its sub-components, links to LICs that represent such subcomponents, etc. The characteristic documents may describe the attributes of the components, its category, or metrics that are applicable to the component. The documents that provide specification of the component may provide the design details of the component and a history of the modifications to the design related to version control. For the prototyping aspect of the component, documents related to prototyping may specify testing conditions, including testing setup and testing results and may also include a modification history of generations of prototyping with modifications related to each generation. The subcomponents of a component may be specified in subcomponent documents, including, e.g., hierarchy documents that may specify how such sub-components relate to each other to form the component and links to corresponding LICs that representation such subcomponents. Through such links, a user of the component may be able to follow the links to examine information related to the subcomponents in an unfragmented manner. All these documents may be version controlled so that different versions of the component design, prototyping, testing, and characteristics achieved may be made accessible to whoever need them.

Figure 7E:
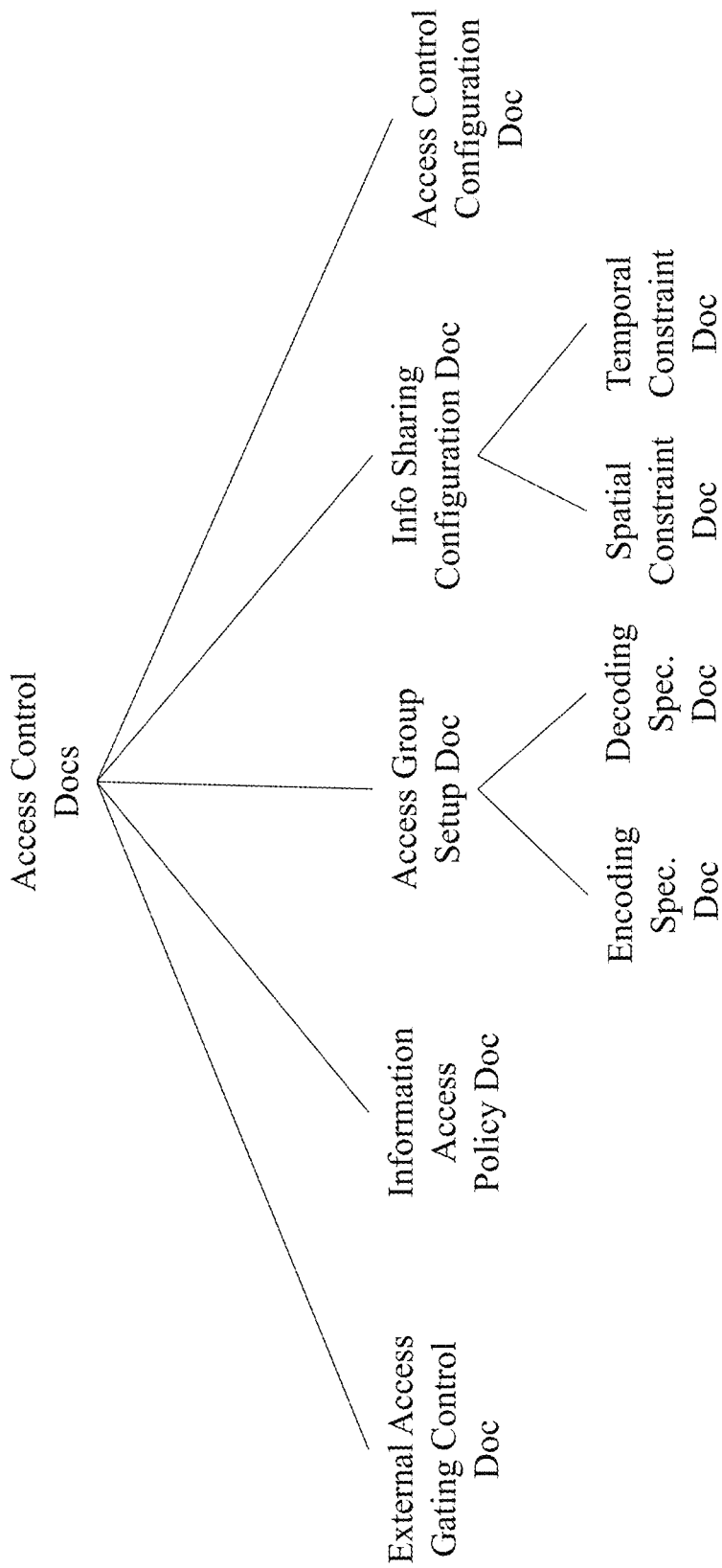
FIG. 7E illustrates exemplary types of access control documents and classification thereof in a LIC, in accordance with an exemplary embodiment of the present teaching.

As discussed herein, each user or each group that desires to access a LIC of a component may do so via tools embedded in the LIC. Such access functions are controlled by the embedded tools based on access control documents. FIG. 7E illustrates exemplary types of access control documents and classification thereof in a LIC, in accordance with an exemplary embodiment of the present teaching. In this illustrated embodiment, access control may include both internally imposed access control and the gating access control to be imposed on any external tools to be used to access information stored in an LIC. As illustrated, external access controls may be carried out based on, e.g., external access gating control documents. For internal access control, information access policy documents may be used to specify the access control policies, access control configuration documents may specify various access control configurations at different levels of security, access group setup documents may provide information related to encoding/decoding schemes specified for different access groups, . . . , and information sharing configuration documents may instruct, e.g., with respect to each user or group, specific access limitations, including spatial limitations (e.g., who can access what) and temporal limitations (e.g., who can access at what time or in what sequence in time). Based on access control documents, a LIC may manage the access control in accordance with the setups, configurations, and instructions specified in relevant access control documents.

Figure 7F:
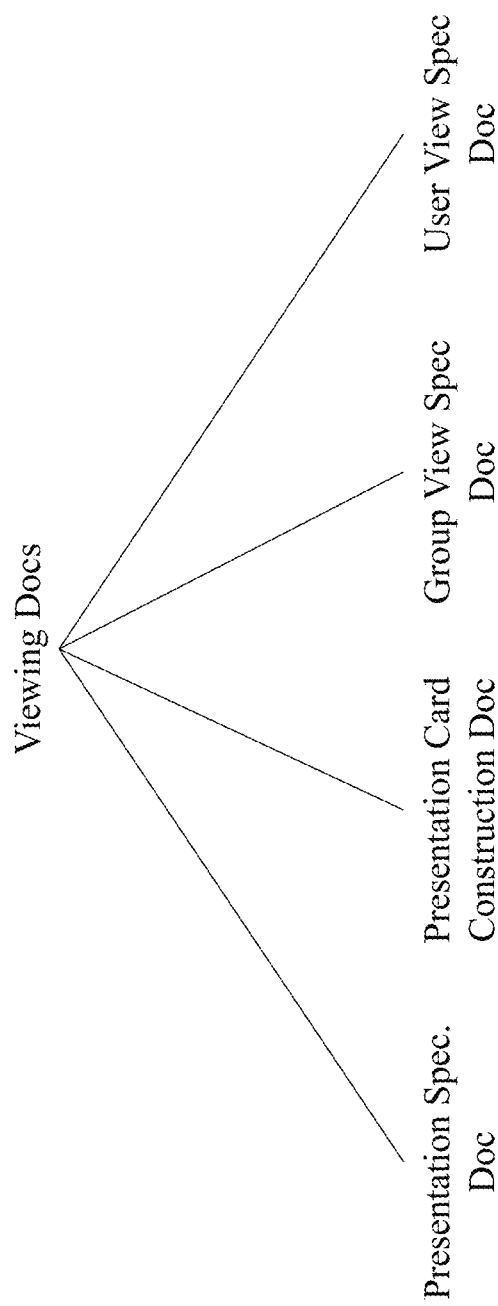
FIG. 7F illustrates exemplary types of documents on user defined views and classification thereof in a LIC, in accordance with an exemplary embodiment of the present teaching.

FIG. 7F illustrates exemplary types of documents on user defined views and classification thereof in a LIC, in accordance with an exemplary embodiment of the present teaching. As discussed herein, a user (whether it is an individual or a group) who accesses information encapsulated in a LIC may define his/her own way to view the accessed information defined via, e.g., some viewing document with specifications. For example, a user view specification document may be used to define an individualized way of viewing information retrieved from the LIC. A group view specification document may be used to define a way for a group to view information from the LIC. For example, based on the needs of a group that has access to 3D data related to a drone product, the group may specify, via a group view specification document, that the 3D data related to the drone product may be provided to the group in 6 views. Based on the same data, a different group or individual may specify differently, e.g., needing only 3 views. In some embodiments, in addition to defining viewing parameters, a user may also specify how information accessed is to be presented in a certain manner to the user via, e.g., presentation specification documents. For instance, a user, whether an individual or a group, may define that three views of some 3D data be presented or displayed in a planar interface simultaneously, while a different user may specify that the three views of the same 3D data be presented or displayed as a time sequence with each view displayed for a certain period of time. In some situations, a user may also instruct the LIC to present or display multiple types of accessed information in an organized way specified by the user via, e.g., presentation card construction documents. In such a presentation card construction document, a user may define, e.g., different types of information to be included in a presentation card, the sources of such different types of information, the construction or organization of the presentation card with, e.g., a layout of different types of information to be presented to the user, etc.

Figure 7G:
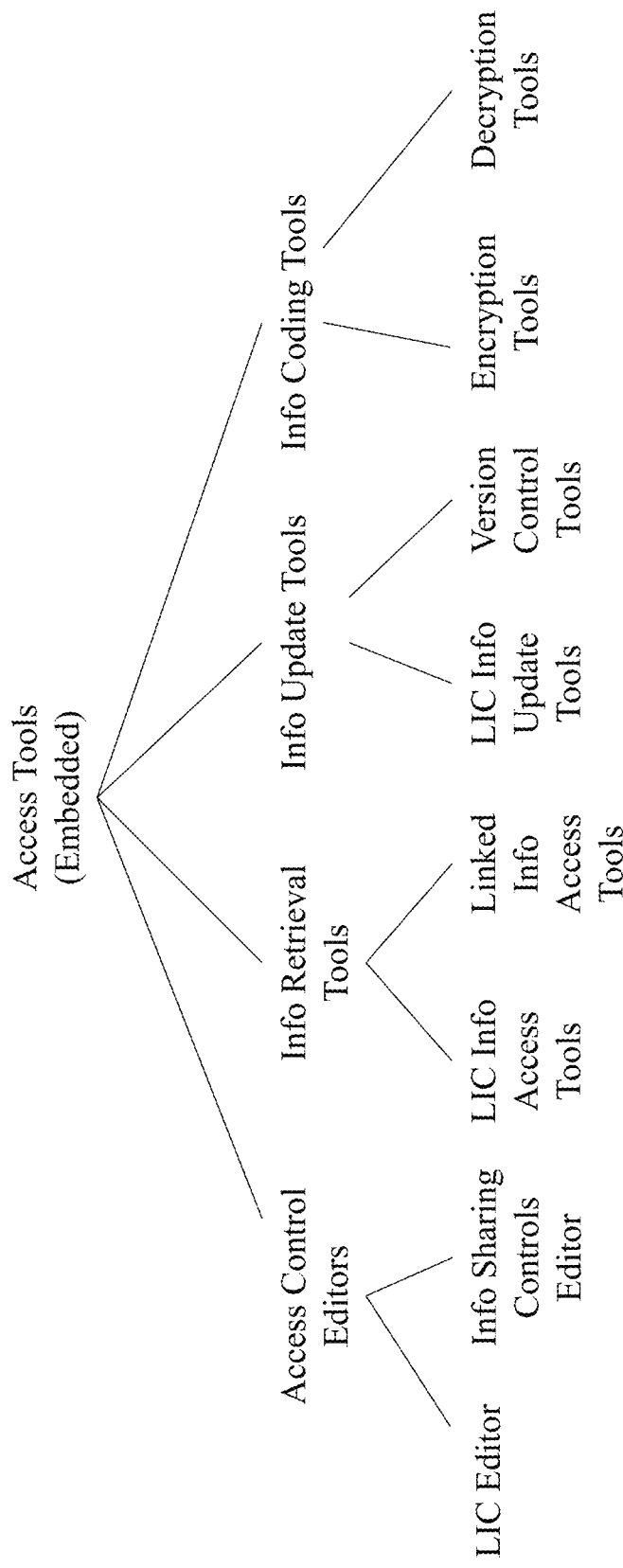
FIG. 7G illustrates exemplary types of access tools and classification thereof embedded in a LIC, in accordance with an exemplary embodiment of the present teaching.

Different exemplary documents stored in the Document Space of a LIC may be used by either the controls residing in the Control Space 620 or tools embedded in the Work Space 630 of the LIC to enable information storage, retrieval, and manipulation by different users. As presented in FIG. 6, various tools embedded in the Work Space 630 may be invoked to carry out different tasks with respect to information accessible from the Document Space 610, subject to relevant access controls in accordance with the control documents stored in the Control Space 620. FIG. 7G illustrates exemplary types of access tools and classification thereof embedded in a LIC, in accordance with an exemplary embodiment of the present teaching. Tools embedded internally in a LIC may fall into different categories, including access control editors (for editing different types of access control instructions), information retrieval tools for controlling how information in the LIC is to be accessed and linked to other LICs, information update tools for updating information in the LIC and corresponding version control, . . . , and information coding tools for specify and enforcing coding (including encryption and decryption) of information required by different users. These categories correspond to the exemplary embedded tools as shown in FIG. 6. These are merely for illustration rather than limitation as additional tools may also be added to the Work Space 630 as needed for different LICs and applications thereof.

Figure 7H:
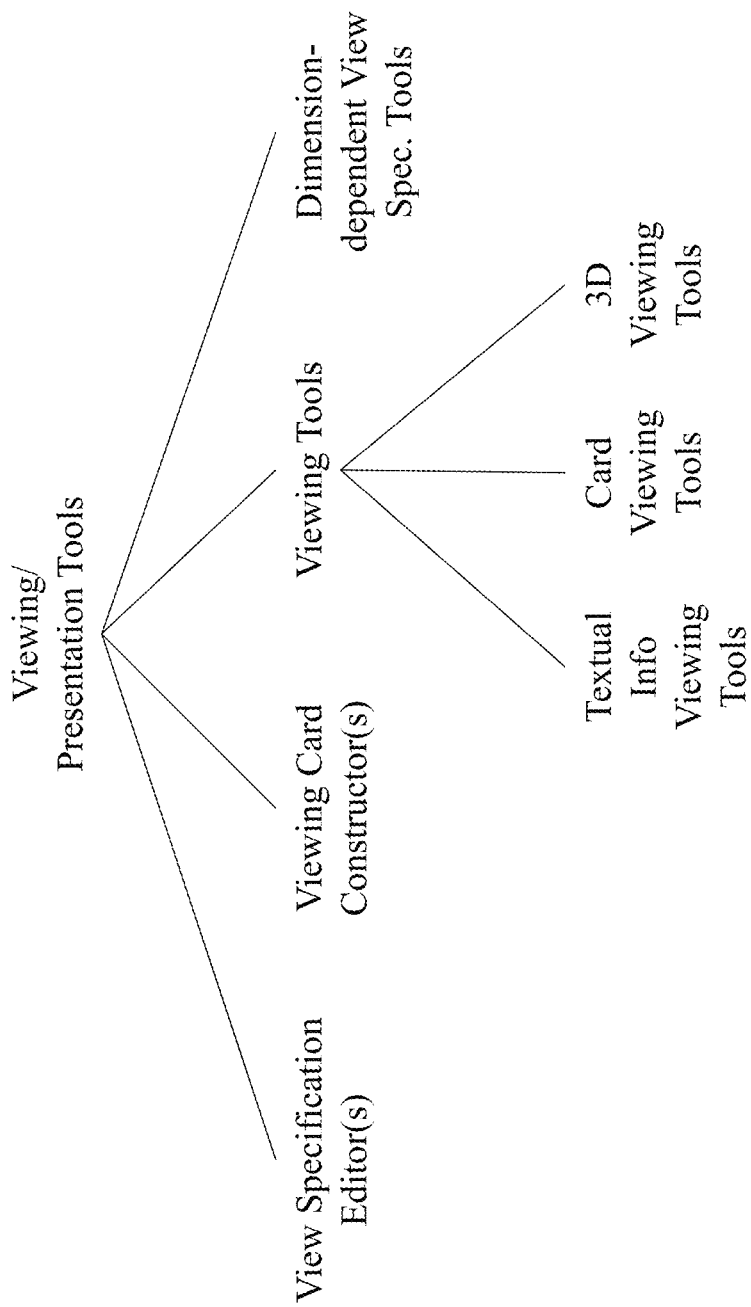
FIG. 7H illustrates exemplary types of viewing/presentation tools and classification thereof embedded in a LIC, in accordance with an exemplary embodiment of the present teaching.

FIG. 7H illustrates exemplary types of viewing/presentation tools and classification thereof embedded in a LIC, in accordance with an exemplary embodiment of the present teaching. To allow users to receive viewing information in a manner consistent with the presentation they specify, a LIC provides tools that allow users to specify the views and presentations/displays thereof as needed as well as tools that allow users to view the information they access in a manner as they define. Exemplary viewing/presentation tools embedded in a LIC may include one or more editors for specifying views/presentations required, one or more viewing card constructors to be used by users to construct viewing cards as specified, and different viewing tools to be used by users to view, e.g., textual information, view cards, or certain special 3D displays. In some embodiments, additional tools related to views/presentations may be provided for specifying or executing dimension dependent display/presentations.

Figure 8:
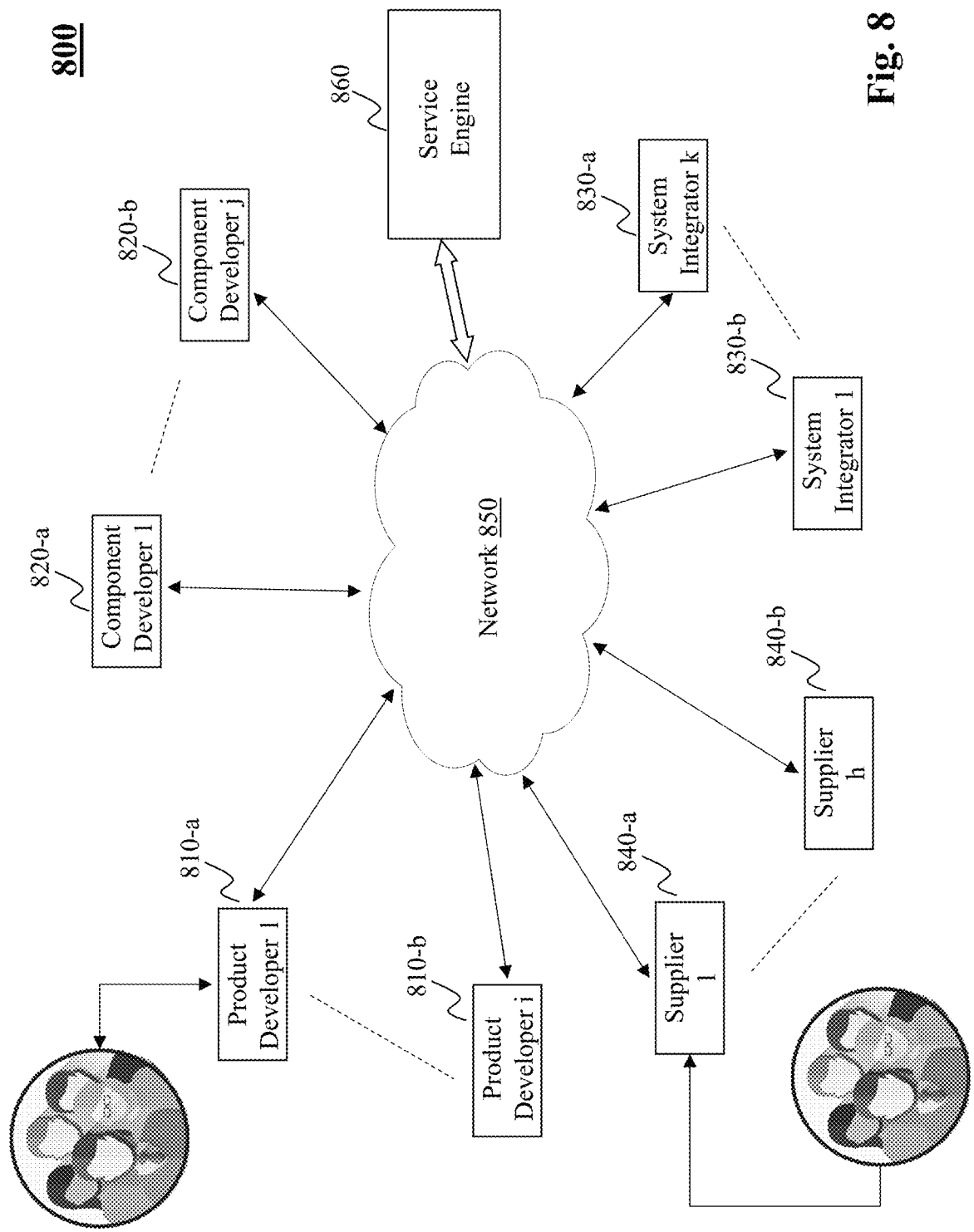
FIG. 8 depicts a networked framework for unfragmented information sharing/management, in accordance with an exemplary embodiment of the present teaching.

A LIC as disclosed herein represents a component (including subcomponents and products) by encapsulating information not only about the component but also about all of its related participants in an unfragmented manner and with tools, either embedded or externally linked, to be used to access and manipulating such unfragmented information in order to maintain the dynamically changing information continuously in an unfragmented manner. Such LICs may be accessed and manipulated by participants playing different roles in life cycles of different LICs. Through the mechanisms of a LIC as disclosed herein, all participants associated with a LIC form a coherent collective and consume and contribute the dynamics of the LIC in a concerted, coherent, and unfragmented manner. FIG. 8 depicts a networked framework 800 for unfragmented information sharing/management, in accordance with an exemplary embodiment of the present teaching. In framework 800, participants from different entities, sectors, or even industries play different roles in respective supply chains and contribute/share/manage relevant information via a service engine 860 that may, e.g., implement the operational scheme via the concepts and implemented LICs. Through the framework 800, for example, there may be suppliers (840-*a*, . . . , 840-*b*), component developers (820-*a*, . . . , 820-*b*), product developers (810-*a*, . . . , 810-*b*), etc. An entity may play different roles in different supply chains. For instance, a company that makes wings for drones may be a component developer (wing is a component of a drone) or a product developer (wing is itself a product) that uses sub-components made by other entities. Each participant (e.g., a supplier of a motor) may have multiple users associated therewith (e.g., different people working at the motor manufacturer) and each user associated with a participant may contribute to or access information from the framework 800 appropriate for a role that the user or the participant plays in a particular context or in a specific capacity. For instance, if a participant is a product developer that desires to use components made by other participants (e.g., component developers) to make a product, then different users (e.g., product design personnel, purchase department personnel, product prototyping team, product testing team, marketing personnel, etc.) associated with the product developer may retrieve, access, update, and/or manage information related to relevant components that is made available via the framework 800.

As discussed herein, participants may not be limited to certain industries, sectors of industries, or companies. Such participants may be linked via the service engine 860 to form various business relationships that establish interconnected and complex supply chains, each involving participants from different entities, sectors of industry, or even different industries. Via the ubiquitous network connectivity, the service engine 860 provides an integrated, coherent, unfragmented data management platform accessible to anyone on the network in a managed manner.

Different participants in FIG. 8 may be related to each other in a flexible way and that is how a supply chain may be formed, maintained, managed, and used to conduct business operations in the marketplace. The service engine 860 may be developed to manage the LICs in the framework 800 with an all-in-one, domain-agnostic cloud-hosted collaboration platform, framework, and marketplace that facilitates the development of projects from conceptualization to deployment and sales. This platform solves the issues of information overload and fragmentation and allows users to work individually, with other users, within and across groups, all while using coherently managed and unfragmented information.

Figure 9:
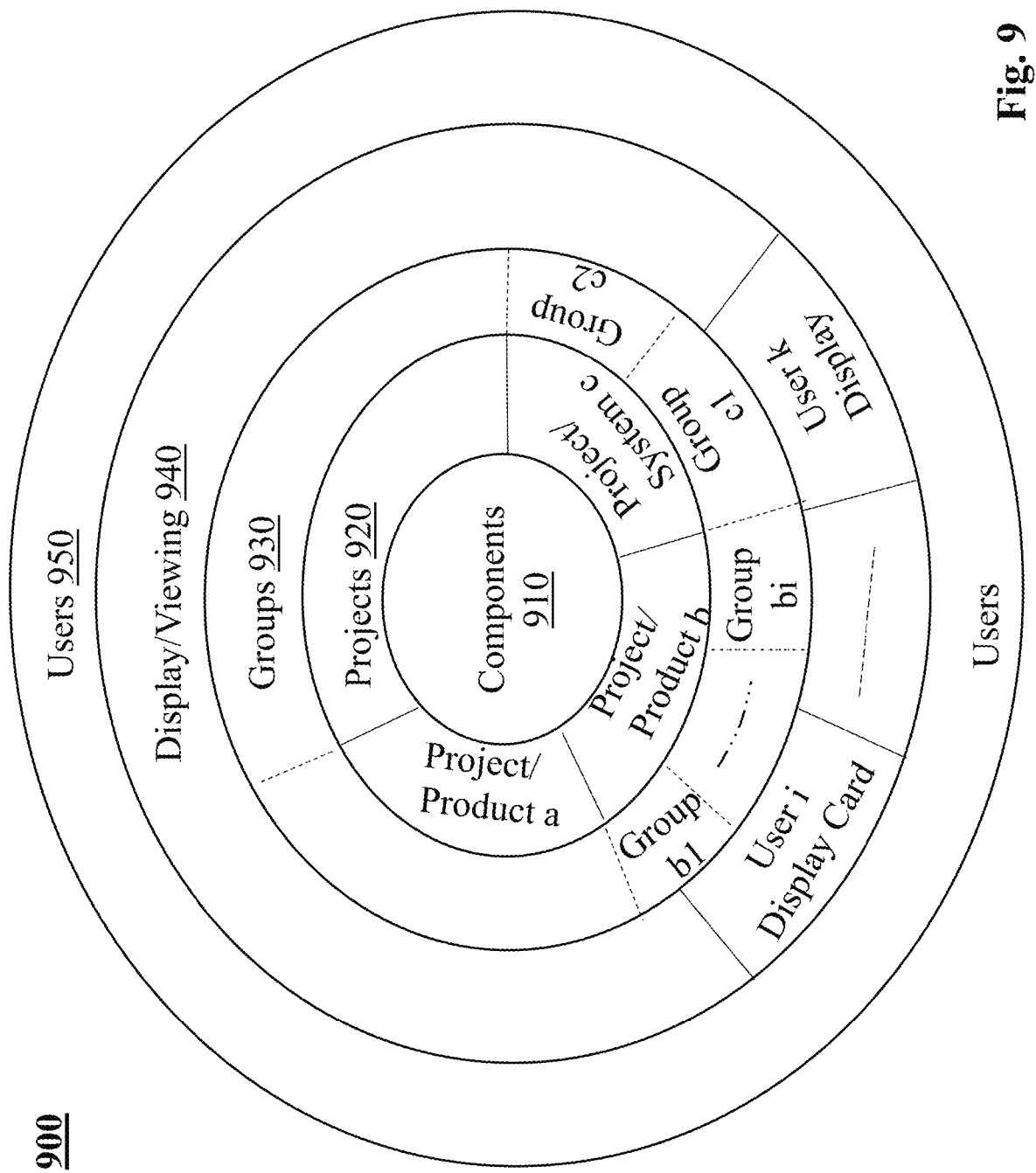
FIG. 9 depicts an exemplary information access hierarchy for accessing information represented as LICs and stored therein, in accordance with an exemplary embodiment of the present teaching.
Figure 10A:
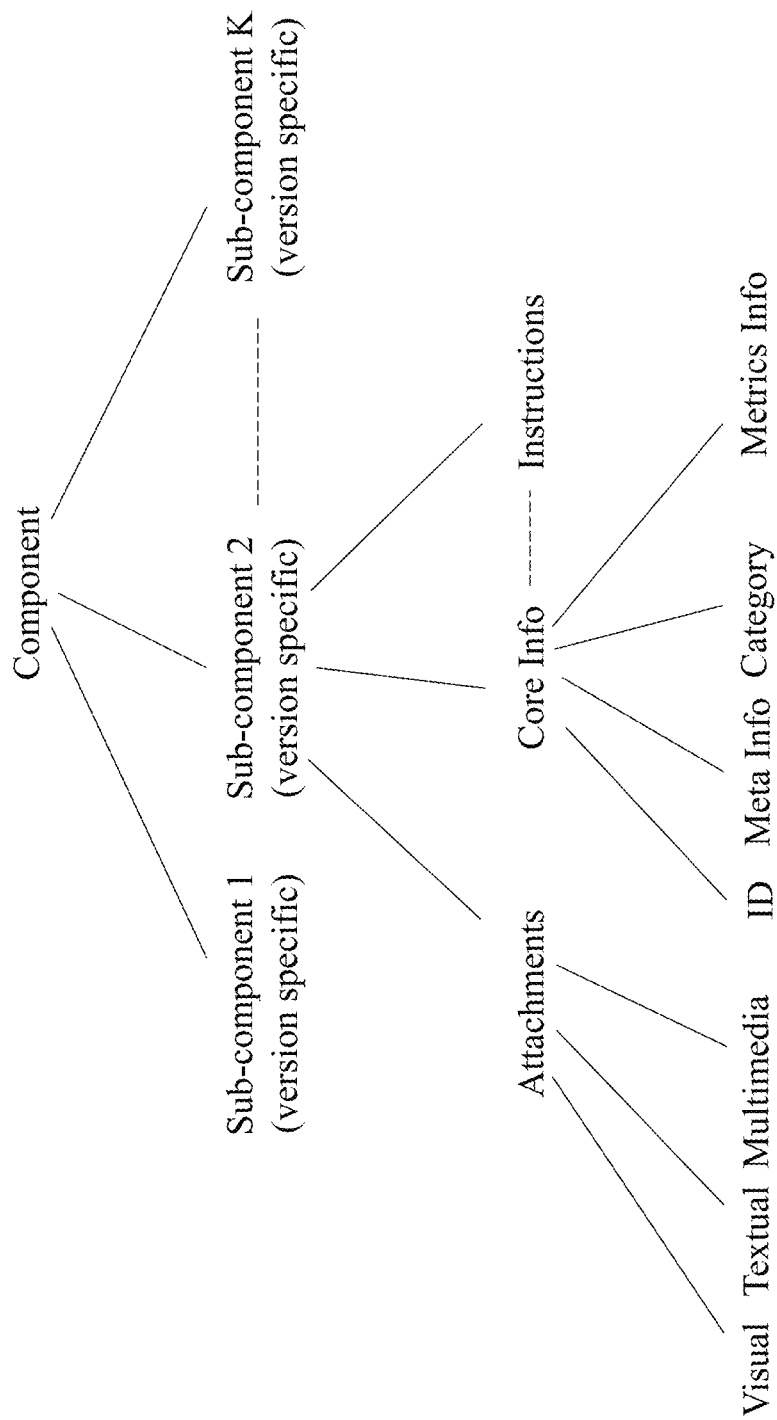
FIG. 10A depicts exemplary organization for a component represented as a LIC in an information access hierarchy, in accordance with an exemplary embodiment of the present teaching.

FIG. 9 depicts an exemplary information access hierarchy 900 operated by the service engine 860 for managing information represented as LICs and stored therein, in accordance with an exemplary embodiment of the present teaching. As can be seen, at the core 910 of the layered or hierarchical structure 900, there are components/sub-components residing therein and accessible to all outer layers. The communication with the core layer 910 for component/sub-components is bi-directional, i.e., information related to the components/sub-components in the core layers may be accessed and manipulated by other layers. FIG. 10A depicts an exemplary organization for a component represented as a LIC at the core layer of 900, in accordance with an exemplary embodiment of the present teaching. As discussed herein, a component may be constructed using subcomponents and it is termed as such because a sub-component is a part that is used as a sub-part of another component or product. A component or a sub-component can be any component or product offered by any user or participant of the framework 800. Similarly, a component can also be a sub-component when it is used as a part of another component. Exemplary relationships as illustrated may be hierarchical, i.e., a component may be constructed based on one or more sub-components. A participant of the framework 800 may develop a component based on sub-components whose information is accessible from the framework 800 and offered by another participant of the framework. With respect to this hierarchy 900, the service engine 860 enables participants to store, manage, access, and made available content at each relevant layer with respect to other participants. Such content may also be updated via different communication channels by different participants.

Each sub-component LIC that can be used for constructing a component LIC may have different versions, each corresponding to a particular form with specifically defined features, properties, and characteristics suitable for being used to construct some defined component. Thus, the composition sub-component used in a component may be version-specific and the properties/features associated with each version may be individualized by a participant of the platform with respect to the component/product to be constructed. Such individualization may be specified via the platform by the participant or company that develops the component/product. The individualized sub-components specified by a component/product developer may be shared via the platform with others so that the individualized version may also be shared and utilized by others, making it more productive and efficient.

As shown in FIG. 10A, a component may be composed of multiple sub-components each of which may correspond to a specific version maintained by the service engine 860. Each of the sub-components may be specified based on several types of information. For instance, taking sub-component 2 as an example, information associated with sub-component 2 may include core information, instructions, . . . , or attachments. Core information may include an identification unique to the sub-component, meta information of the sub-component (e.g., dimension, color, . . . , ), category classification, . . . , some metrics associated with the sub-component (e.g., the temperature it can sustain without deformation). Instructions may be information defining, e.g., different operations of the sub-components. For example, an instruction set may include a series of instructions to describe actions to be performed in a particular sequence. For instance, a sub-component may be associated with several instruction sets, some for various steps to be performed for prototyping, some for steps to be performed for testing, some for steps directing installation when used in the component. Attachments associated with a sub-component may include visual information (e.g., a design drawing, a 3D model specification, a prototyping picture, a video showing how a test can be performed on the sub-component, etc.), textual information such as software code or user specification, or multimedia information such as a video showing step by step, visually with audio instructions, how the sub-component can be installed or deployed.

Figure 10B:
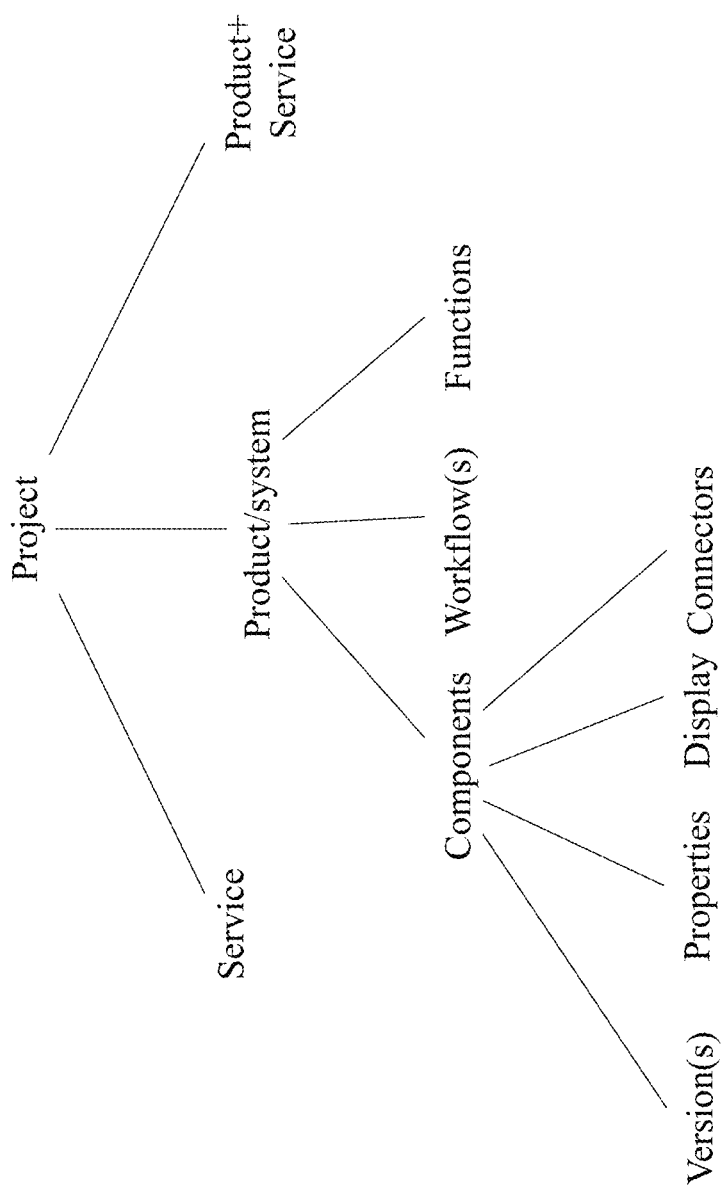
FIG. 10B illustrates an exemplary information organization for a project represented as a LIC accessible in an information access hierarchy, in accordance with an exemplary embodiment of the present teaching.

In the hierarchy 900, participants at other outer layers may provide new input to the core layer related to certain components/sub-components stored therein. This includes creating components/sub-components by a participant at an outer layer (e.g., a user) and/or modifying information related to the components/sub-components stored at the core layer or providing feedback on some of the components/sub-components stored in the core layer. As seen in this exemplary layered structure, outer from the core layer 910 with components/sub-components, there is a project layer 920, a group layer 930, a display layer 940, and a user layer 950. At the project layer 920, a project and information associated therewith may be created, stored, accessed, and updated. FIG. 10B illustrates an exemplary information organization for a project represented as a LIC accessible in an information access hierarchy, in accordance with an exemplary embodiment of the present teaching. Each project may be related to a product/system, a service, or a combination of a product/system and associated services. The project layer 920 may comprise a plurality of projects, each of which may be designed to utilize one or more components/sub-components from the core layer 910. A product developed for a project may also be sent to the core layer so that it can be used by other projects as a component. Each project in layer 920 may use a different number of components from the core layer 910 for building its product and/or based on different characteristics of such components relevant thereto.

As discussed herein, in addition to that a project may be a product/system or a service, a project may also have a life cycle with multiple stages, which may be sequentially arranged, overlapping, or repeating. For instance, the life cycle of a product in a project may comprise a product planning stage, a product design stage, a development stage, a testing stage, a production stage, a marketing stage, a sale stage, etc. As discussed herein, a product may also involve different associated services, e.g., the financing services in product development stage, testing services, fabrication service for production, legal service (e.g., sale contract drafting and review), or after-sale services such as insurance, repair, maintenance, etc. Each product may be defined and specified via the service engine 860 and such information may then be used to guide the management of the project. For example, as shown in FIG. 10B, a product/system may be defined and its design may be specified according to, e.g., components used, the connections among such components, the workflows, and the intended functionalities. Each of the components used in the product may be specified as being linked to the product based on information available from the framework 800. Information about components linked to a product may specify the source of the components (e.g., offered by which component developer who is also a participant in 800). For each component accessible from the service engine 860, a product developer may select an appropriate version of the component for their own use, individualize characteristics of the component relevant to the specific product developer, including the properties of the component, features to be displayed, and optionally, e.g., connectors that can be used to connect this component to others.

With framework 800, different aspects of a project throughout its entire life cycle can be managed efficiently without information fragmentation. Each of the stages or aspects involved in a product life cycle, including services associated with the product and product development, during the life cycle of a project may involve different entities. For example, the product marketing stage may involve a group of personnel inside of a company such as design engineers, product manager, sale personnel, and marketing personnel. The same stage may also involve personnel from outside of the company such as a financing institution, media companies, customer representatives, etc. To ensure that all entities involved do what is required for different tasks, appropriate information flows need to be managed. Traditionally, it is managed in an ad hoc manner with fragmented information. As a consequence, information is often lost, delayed, or sent to incorrect entities. With framework 800, information flows among diverse entities involved in a project according to electronically committed specification and all information for diverse parties is managed on a coherent platform without loss of information. Framework 800 provides a platform that allows all such entities to use information managed on the same platform to ensure that information flows among entities whenever needed in whatever directions appropriate based on a specification of the project.

Figure 10C:
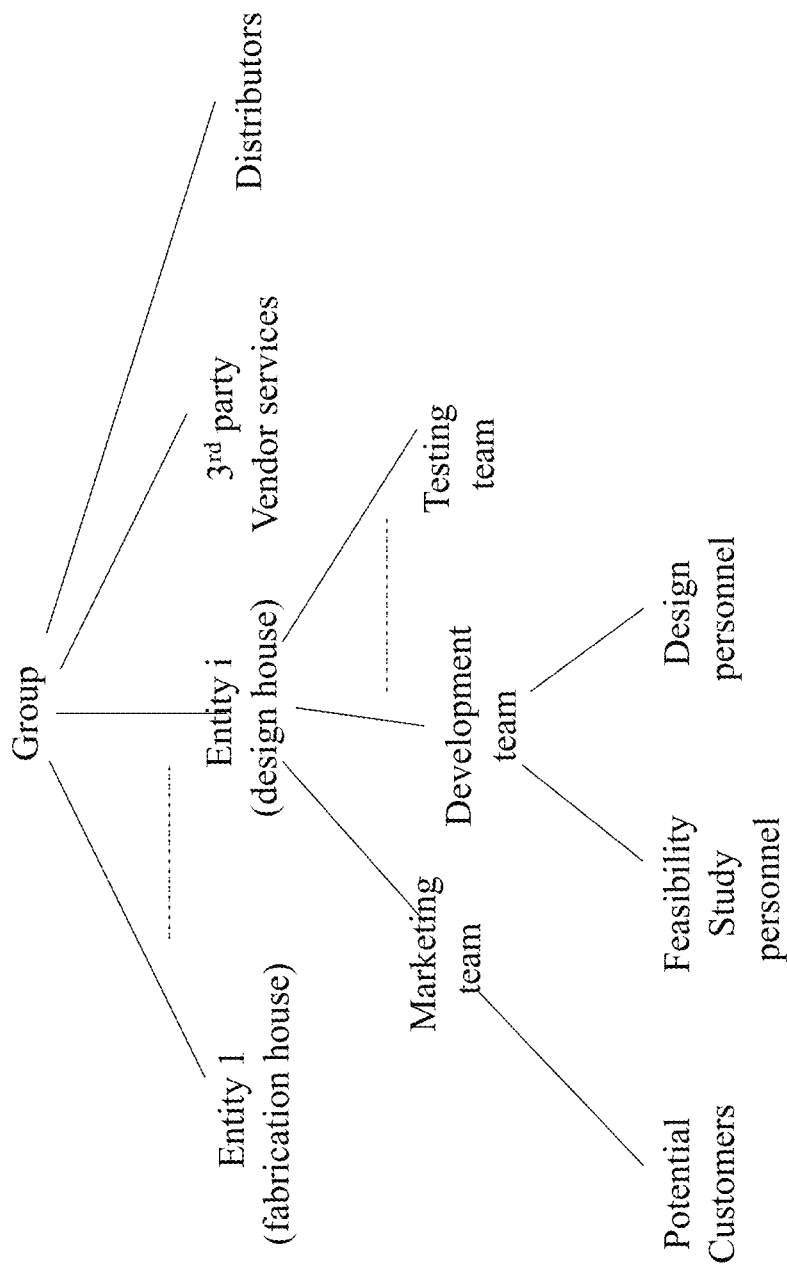
FIG. 10C illustrates an exemplary information organization for a group accessing different layers of a LIC information access hierarchy, in accordance with an exemplary embodiment of the present teaching.

A group at the group layer 930 may refer to a group of users associated with a participant/entity operating in the framework 800. FIG. 10C illustrates some exemplary information organization for a group in an information access hierarchy, in accordance with an exemplary embodiment of the present teaching. As discussed herein, a group formed for managing the entire life cycle of a product may involve multiple entities/companies, including, e.g., an entity 1 of a fabrication house for manufacturing the product, an entity 2 of a design house for designing the product (prior to the manufacturing), . . . , one or more $3^{rd}$ party vendor service providers (e.g., banks for financing, accounting firm, marketing firm, etc.), and one or more product distributors for distributing the product. Different entities in a group work together in their respective designated capacities to manage and maintain information and information flows necessary in order to complete the tasks at each stage of the product cycle. While a group may involve different entities from different participants or users, an entity that participates in a group (e.g., a marketing firm) may also be involved in other different groups (e.g., the marketing firm does marketing for different product manufacturers). In each of the groups that the entity belongs, there may be a defined role and task for the entity to play and perform. For instance, a marketing firm may have multiple clients and each of its clients may contract the marketing firm to market a product. In this case, the marketing firm participates in different groups of its clients and in each group, the task is to market the product of that particular client.

Different entities involved in the same group may operate in the framework 800 in a way that allows them to fulfill their respective roles. Each may access different types of information and may control information flowing between different entities at times that are appropriate, etc. This is performed by communicating with different layers in the hierarchy 900. Depending on the specific role to be fulfilled, each entity/personnel utilizes different communication channels. In some embodiments, each group may be associated with and responsible for one or more projects, which may involve different users in the group. The user layer 940 includes all users or participants who have access rights in the framework 800. Such users may be grouped into different groups (at the group layer 930) and participate in different projects (at the project layer 920) based on the components/sub-components residing in the core layer 910. For example, a group of users at company A may sign up with the service engine 860 for information services in framework 800 related to a project to develop, e.g., a drone product. As discussed previously, this group may include design engineers, prototyping engineers, test engineers, customer relationship personnel, a financing team, a marketing team, a sales team, etc. Each of the users in this group may interact with some different layers of information hierarchy 900 via the service engine 860 to accomplish respective tasks relevant to the role of the user. For example, if a user of a certain group for developing a drone is a design engineer, the user may access information about different components in the core layer that may be used as parts of the drone. In addition, the user may provide certain specification or requirements on the components the user is interested so that the component developer (e.g., another group in the group layer) may consider producing a customized version of the component. At the same time, another user from the same group for developing a drone product may play a role as a product manager, who may access information related to different groups that correspond to, e.g., outsource manufacturers, in order to find a company to mass produce the drone product.

In the layered structure 900, there may also be groups that represent different service providers that link to other groups via, e.g., a project. For instance, a financial institution such as a bank may access information related to different projects at the project layer to identify projects for which loans are sought. To facilitate demand-and-supply relationships among different groups or users, the group layer may provide a certain bulletin board for different participants to post information that is public to all participants to the platform. For instance, a group may seek investment in develop a drone product for the market, another group representing a financial institution may post on the bulletin board looking for investment opportunities. This can facilitate participants to identify matching opportunities.

As discussed herein, a user at the user layer 950 who has access to information represented as a LIC may specify his/her own viewing/displaying preferences with respect to the information accessed. In the exemplary hierarchy, this is through the display layer 940, wherein the user may specify or define a customized display for a sub-component, a component, or a product from the perspective of the user or a group to which the user belongs. That is, though the display/viewing layer 940, different users or groups who use the same component/subcomponent or product may define to display accessed information using different sets of properties or characteristics of the component/subcomponent in a way that is relevant to the individual use. Therefore, not only the use of each available component/sub-component may be individually customized, the display of a component/sub-component in such a customized usage may be further customized for each use. This provides a user of the framework 800 much flexibility and different degrees of freedom.

Figure 11A:
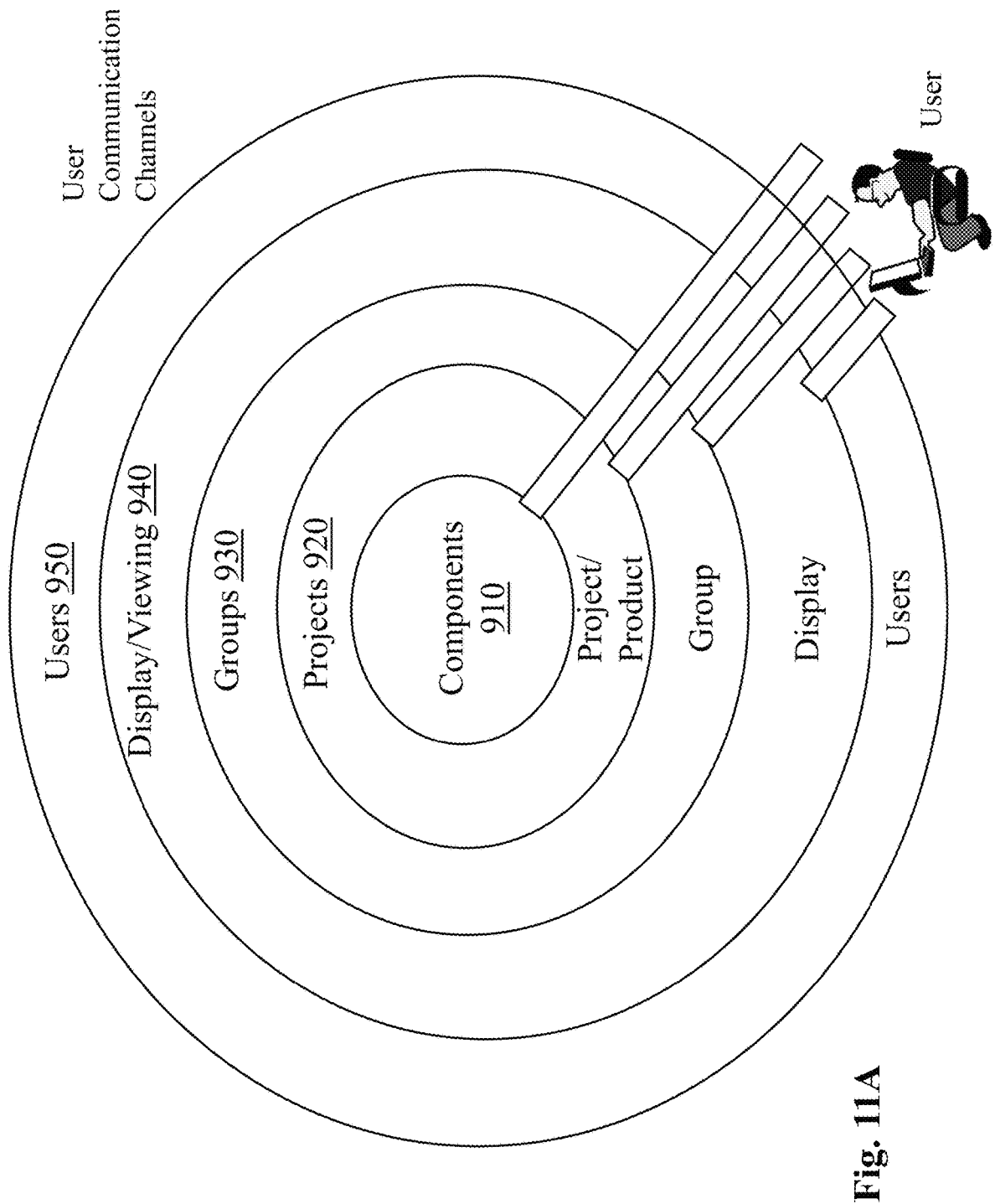
FIG. 11A illustrates that a user establishes multiple information access channels at different layers of an information access hierarchy, in accordance with an exemplary embodiment of the present teaching.

As discussed herein, via the layered hierarchy 900, different users may establish communication channels with different layers of the hierarchy 900. FIGS. 11A-11F illustrate different participants establishing information access channels at different layers according to their needs. FIG. 11A illustrates that a user establishes multiple information access channels at different layers of an information access hierarchy, in accordance with an exemplary embodiment of the present teaching. As can be seen, a user at the user layer 950 may set up communication channels for accessing any of the layers in hierarchy 900. For instance, a user can access information stored and managed in the component/sub-component layer 910 via a communication channel to that layer to, e.g., search for, provide feedback about, update/modify information related to certain component/sub-components at the components/sub-components layer. A user may also access information related to one or more products/projects at layer 920 that the user is working on via a communication channel linking the user to the project/product layer. The user may also be linked to more than one products/projects in the hierarchy 900 via, e.g., multiple groups defined on the group layer 930 and may retrieve and update information associated with such groups through a communication channel established for the group layer. For example, a user may retrieve information associated with his/her group, e.g., a schedule of each member's tasks, and then update certain information when appropriate, e.g., when the user fulfilled his/her tasks so that the current status on the schedule may be updated. As discussed herein, a user may also, via a communication channel to the display layer, specify or modify the customized display setting for a component or product that the user is responsible for.

In some embodiments, group-based information access and management may also be needed. Such group-based access may be carried out by designated personnel associated with the group, e.g., one or more representatives of the group, each of which may be configured to carry out certain types of communication with different layers on hierarchy 900. In some embodiments, based on the nature of a group and specific functionality of the group, a user associated with a communication channel with the group may be limited to certain information access rights to utilize such communication channels to communicate with other members of the group.

Figure 11B:
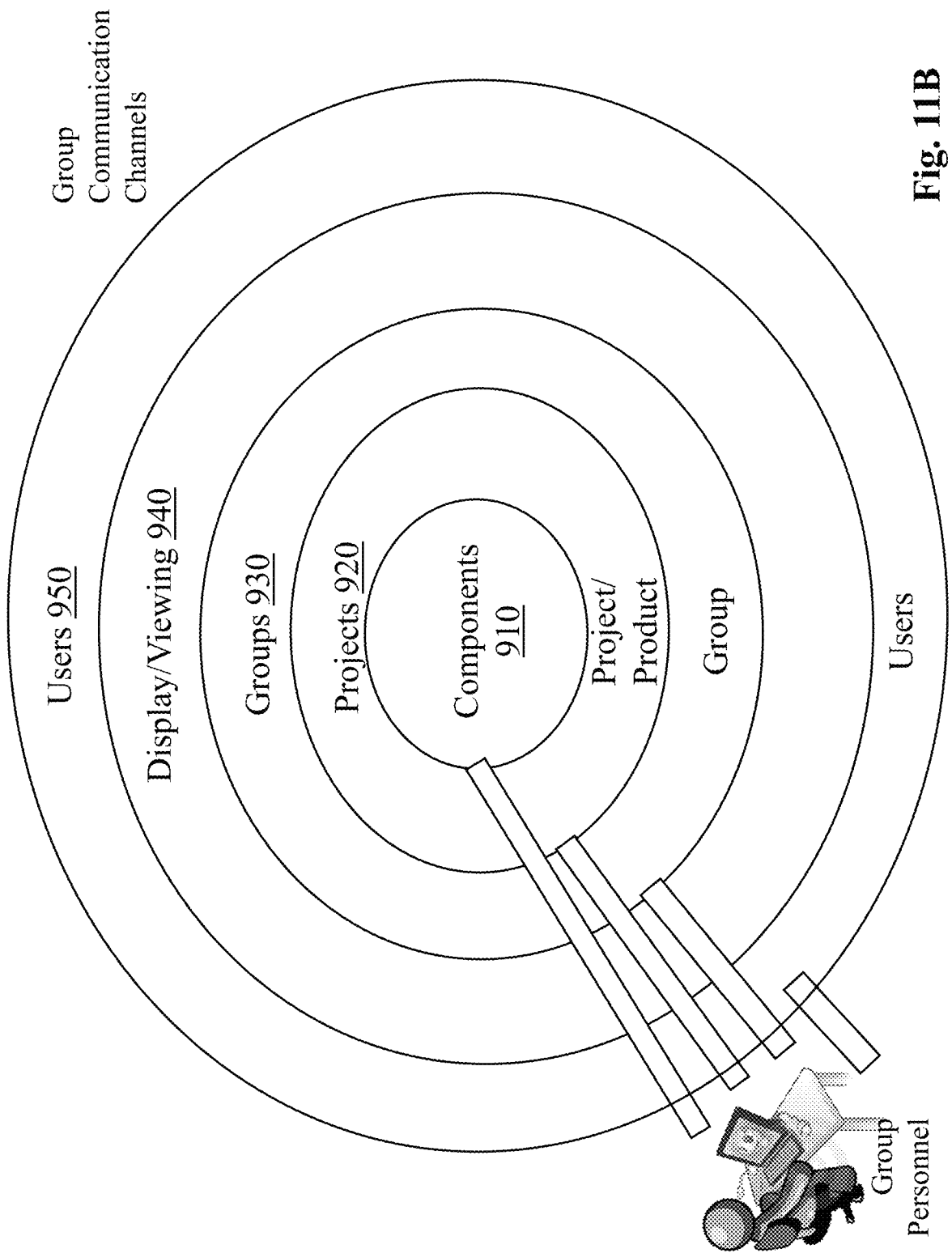
FIG. 11B illustrates that a group establishes multiple information access channels at different layers of an information access hierarchy, in accordance with an exemplary embodiment of the present teaching.

FIG. 11B illustrates that a group or its representative personnel establishes multiple information access channels at different layers of an information access hierarchy 900, in accordance with an exemplary embodiment of the present teaching. As illustrated in FIG. 11B, a group may access multiple layers of information in the hierarchy 900 by setting up different communication channels with different layers, including the component/sub-component layer 910, the project/product layer 920, the group layer 930, and the user layer 950. In some embodiments, the group or its representative personnel may also set up so that the group may also have access to the display layer 940 in order to, e.g., configure a customized display interface for a product/component/sub-component.

Figure 11C:
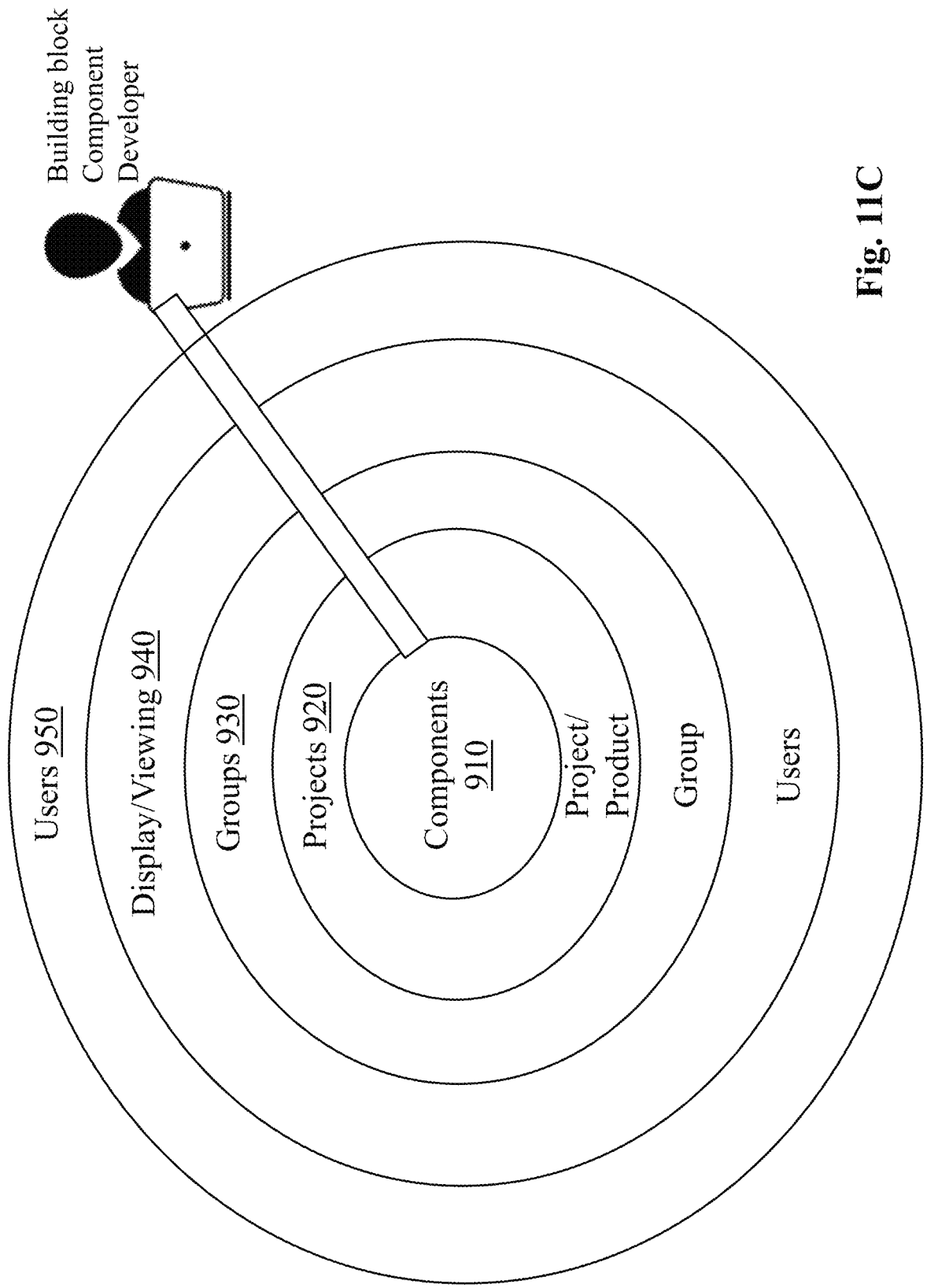
FIG. 11C illustrates that a building block component developer provides information of a building block component represented by a LIC through an information access hierarchy, in accordance with an exemplary embodiment of the present teaching.

FIG. 11C illustrates that a particular type of participant called a building block component developer that provides information on a building block component represented by a LIC representing in an information access hierarchy, in accordance with an exemplary embodiment of the present teaching. A building block component developer is a participant that supplies basic building block components that do not have sub-components. In this specific case, a building block component developer may interface with service engine 860 to participate in information creation and management via a communication channel to only components/sub-component at the core layer 910, providing information about such building block components to the core layer, retrieving information about certain building block components that other participants provided for, e.g., customizing or improving such building block components.

Figure 11D:
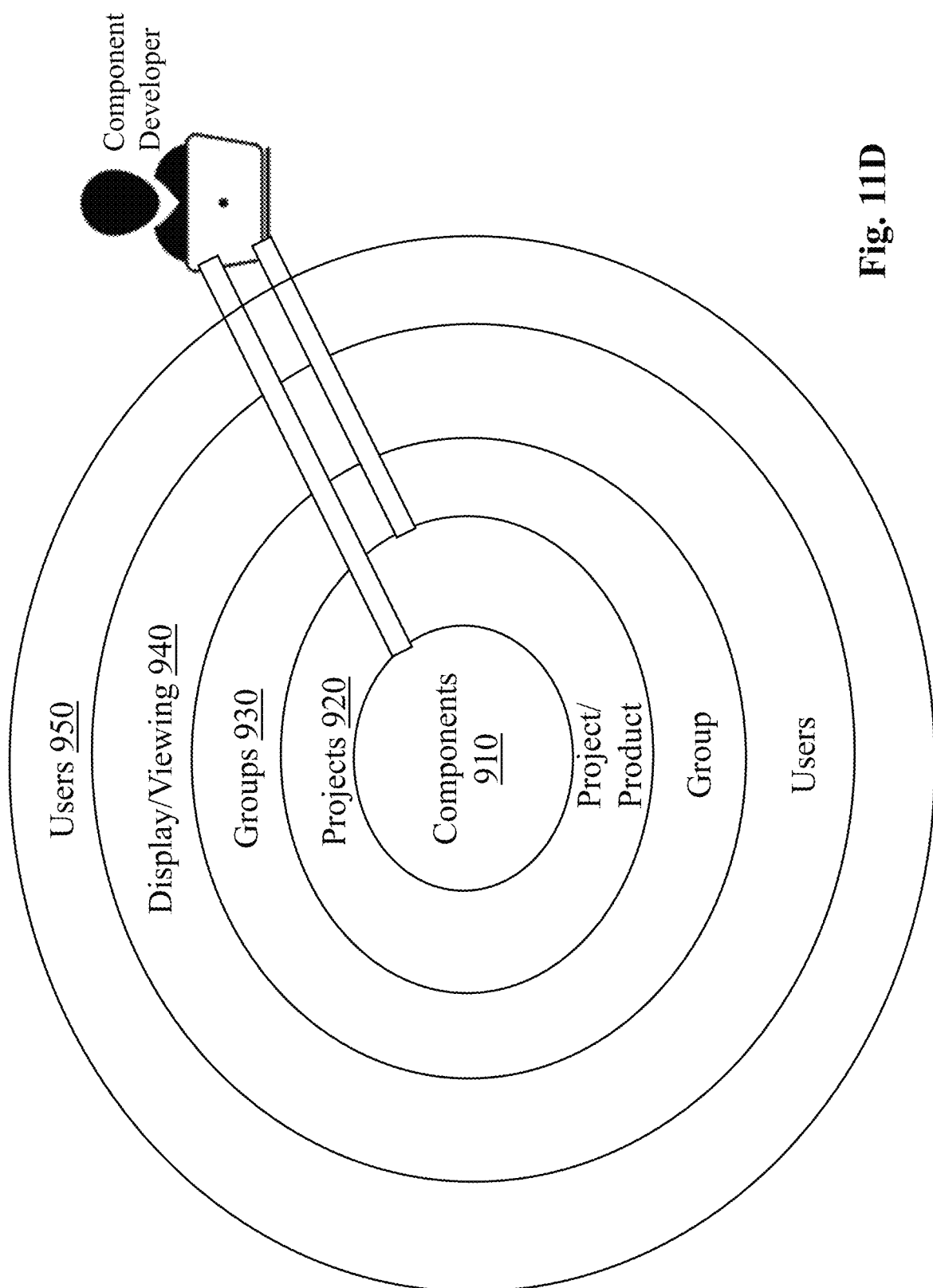
FIG. 11D illustrates that a component developer accesses information at different layers of an information access hierarchy as a supplier or a user of other components, in accordance with an exemplary embodiment of the present teaching.

FIG. 11D illustrates that a component developer participant may access information at different layers of the information access hierarchy 900, in accordance with an exemplary embodiment of the present teaching. In this illustration, a participant is a component developer, which corresponds to a party that can act as both a supplier to others and a user of components/subcomponents offered by other participants. As a component may either be used by others to make a product or it may use subcomponents from others as its parts, its developer is a participant that may access information both at the component/sub-component layer 910 and at the project/product layer 920. As such, FIG. 11D shows that a component developer may establish communication channels connecting to both layers 910 and 920. In addition, as a component developer may also correspond to a group (e.g., different users from internal and external organizations) associated with the component it develops, the component developer may also establish appropriate communication channels, when needed, associated with one or more groups at group layer 930 (not shown).

Figure 11E:
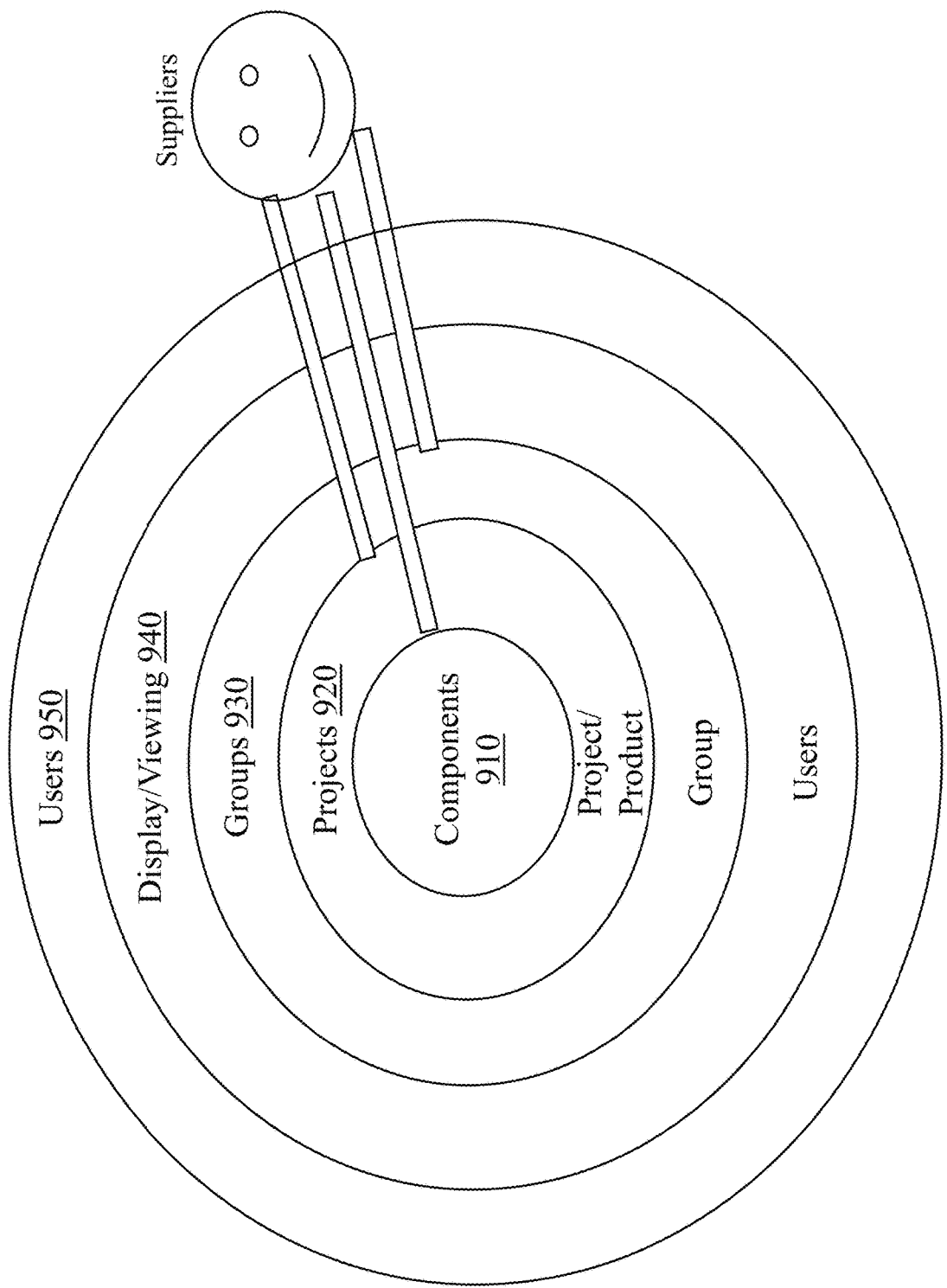
FIG. 11E illustrates that a participant accesses information at different layers of an information access hierarchy as a supplier or as a marketer, in accordance with an exemplary embodiment of the present teaching.

FIG. 11E illustrates exemplary types of communication available to a supplier as a participant, in accordance with an exemplary embodiment of the present teaching. In this example, a supplier may be a, e.g., distributor of certain supplies that participates in the framework 800 to provide supplies to whoever needs such supplies. For example, if a supplier sells salt, it may access the information access hierarchy 900 to see which components (by access information at the core component/sub-component layer 910) and which projects/products (by access information at the project/product layer 920) need salt as an ingredient to, e.g., identify a potential business relationship with other participants of the framework 800. The supplier may further access group information via the communication channel with the group layer 930 to determine, e.g., some parameters for entering into a business relationship with certain participants. For instance, each of the identified potential business relationships (participants or companies) associated with the identified components/products may desire or have previously agreed price range and/or timeline as to delivery that the distributor needs to honor in order to enter into a business relationship.

Figure 11F:
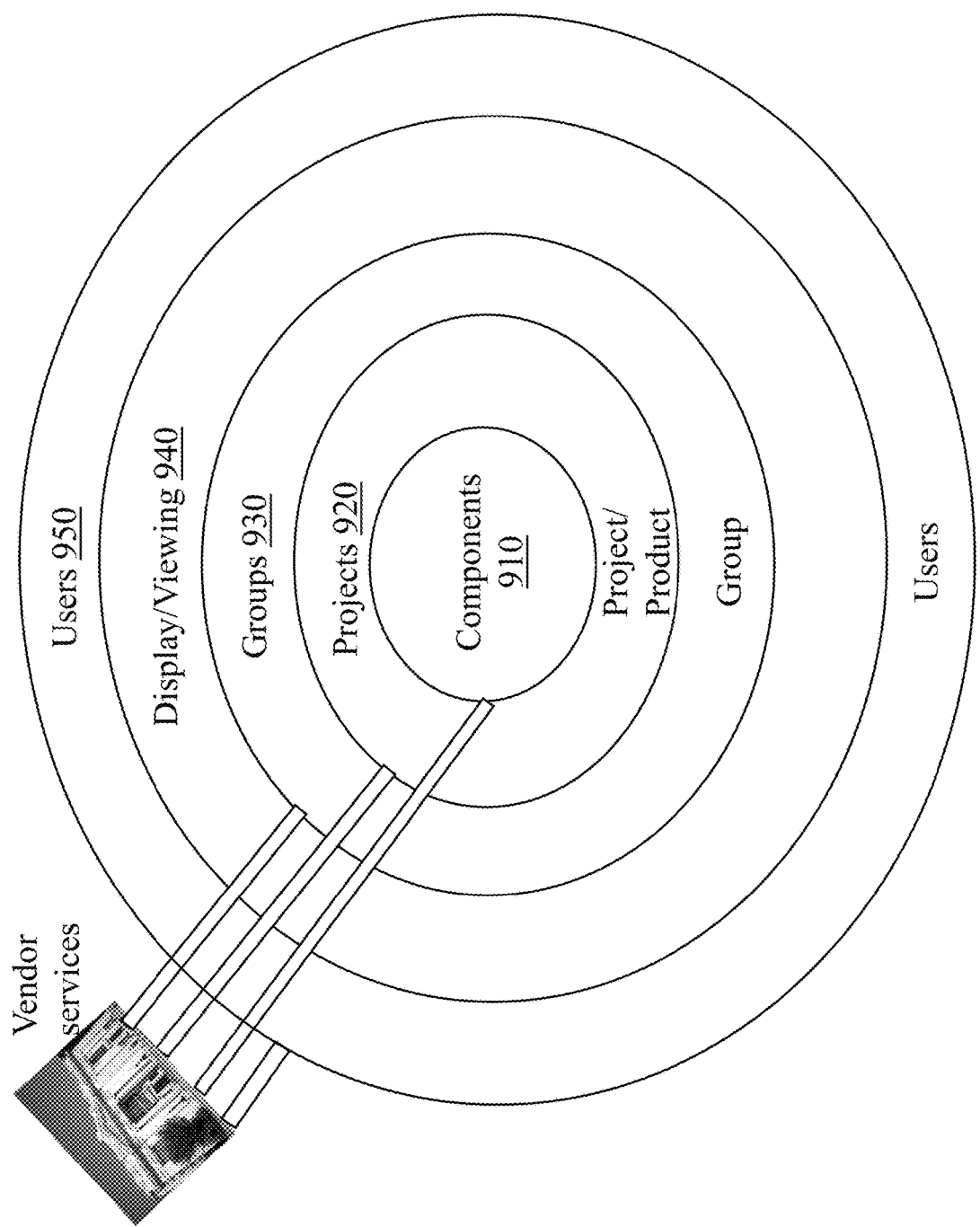
FIG. 11F illustrates that a participant accesses information at different layers of an information access hierarchy as a vendor or service provider, in accordance with an exemplary embodiment of the present teaching.

FIG. 11F illustrates exemplary communication channels that $3^{rd}$ party vendor service providers may utilize to provide their respective services, in accordance with an exemplary embodiment of the present teaching. As illustrated, $3^{rd}$ party vendor service providers may utilize various communication channels to different layers of the information access hierarchy 900 to facilitate, e.g., advertising, negotiating, entering into service agreement, and delivering their respective services through LICs residing at different layers of the information access hierarchy 900. Such $3^{rd}$ party services may be provided to participants at all layers so that the $3^{rd}$ party service providers may establish communication channels with all layers in the hierarchy 900 in order to access information from and contribute information to different LICs residing at different layers. For example, a bank in the business of providing financing to businesses may access information at the component layer 910 to see which components present opportunities for investment. It may also access information related to different projects/products at the project/product layer 920 for, e.g., the same purpose. It may also obtain information about different groups which may represent different companies or parties (at group layer 930) to which investment may be made. Similarly, when a party involved in a certain product/project corresponds to an individual user, the bank may access information about such individual user at the user layer 950 in order to make appropriate business decisions.

There may be many other combinations of communication channels that a participant of the framework 800 may establish in the information access hierarchy 900 in order to doing businesses with other participants on this platform. In general, so long as the access restriction allows, a participant may be able to access information made available at different layers of the information access hierarchy 900 in accordance with its needs.

The service engine 860 is provided to enable the operation of the information access hierarchy 900 to provide unfragmented information storage, access, use, and manipulation to participants from different entities, sectors, industries, as shown in FIG. 8. In the information access hierarchy 900, there are different layers of information that may be represented by LICs as disclosed herein and their operations are facilitated by the service engine 860. Through network 850, the services enabled by the service engine 860 via the LICs residing at different layers of the hierarchy 900 are made available to different participants via network connections as depicted in FIG. 8.

Figure 12:
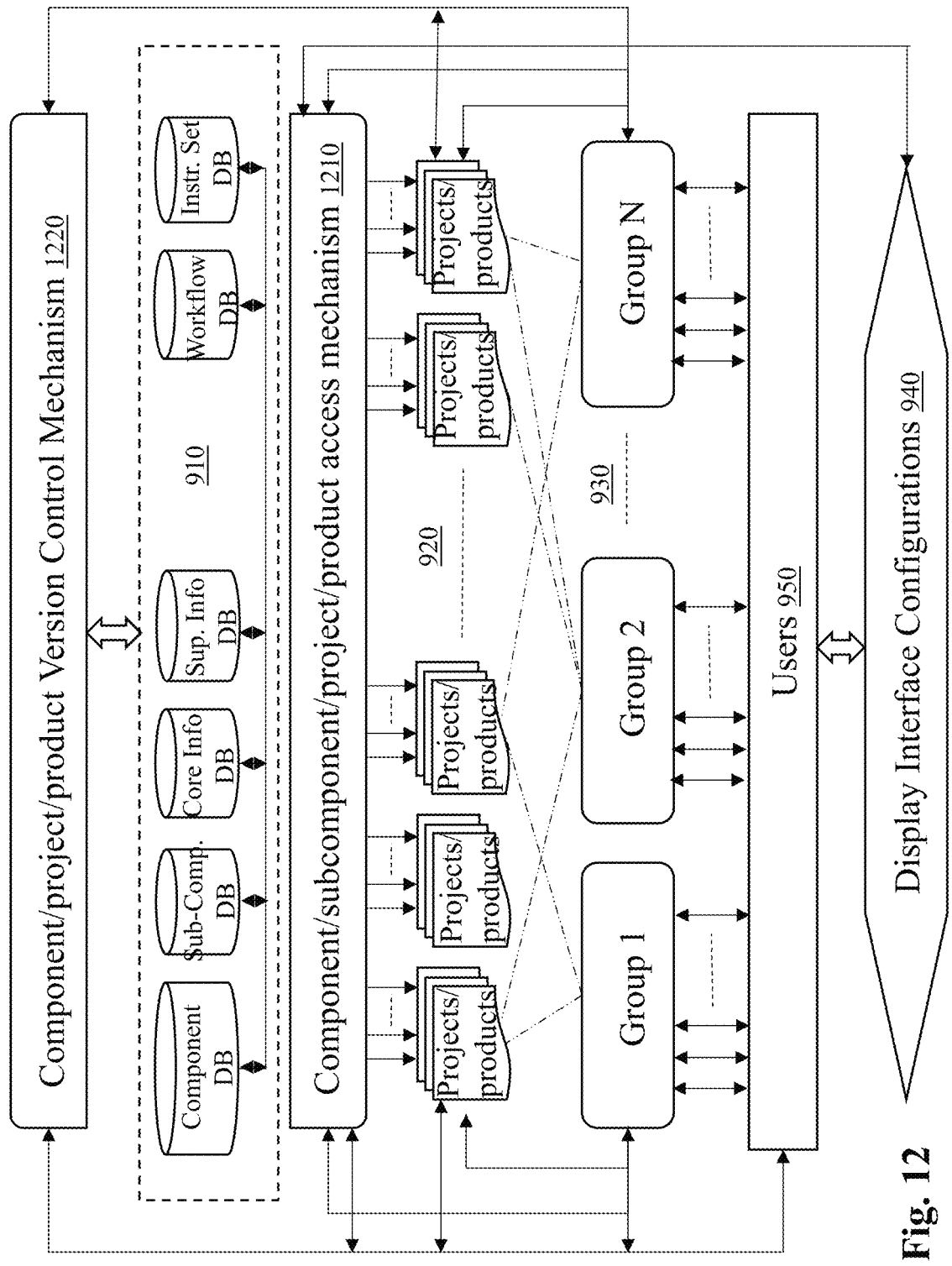
FIG. 12 depicts an exemplary high level system diagram of an information service engine, in accordance with an exemplary embodiment of the present teaching.

FIG. 12 depicts an exemplary high level system diagram of the service engine 860, in accordance with an exemplary embodiment of the present teaching. The depicted high level system diagram for 860 is constructed to facilitate the operations within the layered structure of the hierarchy 900, support different functionalities related to LICs at different layers of the hierarchy 900, and facilitate communications between different layers in hierarchy 900. The support to information management in hierarchy 900 is through functionalities provided by the service engine 860 to enable various participants of the information management framework 800 to create, access, update, and linking various LICs active in hierarchy 900 to allow unfragmented information management. As seen in FIG. 12, the service engine 860 also coordinates information flow and management at and between different layers.

The service engine 860 is provided to implement the LIC as depicted in FIG. 6, facilitate different participants of the information management framework 800 to create, access, and update their relevant information in the form of LICs in an unfragmented manner, and support information flows among participants in accordance with the information access hierarchy 900. As such, the service engine 860 has in its system diagram as shown in FIG. 12 various parts that are consistent with the layers as depicted in FIG. 9. This includes a component/subcomponent layer 910, a project/product layer 920, a group layer 930, a user layer 950, and a display layer 940. In FIG. 12, the component/subcomponent layer 910 and the project/product layer 920 include different databases/files/archives for storing information associated with respective components, subcomponents, projects, and products (or LICs as represented) classified as, e.g., publicly accessible, confidential, or privileged types of information. Such classified information associated with each LIC (representing a component, a subcomponent, a project, or a product) is stored in the Document Space 610 of the LIC (see FIG. 6).

The group layer 930 and the user layer 950 store information about users and groups, e.g., identities of users/groups, the organizations of the users in groups, limitations to be imposed on users/groups in terms of access, manipulation, coding, and distribution of information they desire to manage, etc. The display layer 940 includes configurations for different users/groups on their view/presentation/display specifications, requirements, and restrictions generated based on communications between the service engine 860 and such users/groups. The information related to each user/group to control accessing/viewing/manipulating/distribution of a LIC representing a component/subcomponent/project/product at layers 930, 940, and 950 may be stored in the Control Space 620 of relevant LICs so that each LIC may be accessed, viewed, manipulated, distributed by different users/groups in accordance with the profiles or limitations set for each of such user/group. In some implementations, user/group information and limitations on their rights may be stored centrally but may be referenced by different LICs for controlling different operations of different users/groups on different LICs in accordance with specified limitations.

Additional databases and storage systems may store information particular to users and groups, including access-related restrictions, access permissions, characteristics, operations, and displays defined by individual participants and groups. Each of such restrictions, permissions, characteristics, operations, and displays may be associated with specific components/subcomponents or versions thereof and the participant defining the same.

Each group may be linked to different projects/products and include one or more users from different entities/participants for each project/product associated therewith. Each project/product may be linked to different components/subcomponents and different entities/users involved in the project/product cycle. Each component/subcomponent or each different version thereof may be used in one or more projects/products. Each component/subcomponent or each different version thereof may be used in different projects/products in different ways or have one or more display configurations with respect to different projects/products and/or groups and/or users. Each user may be linked to different components/sub-components, one or more projects/products, or one or more groups. Each group may define its own characteristics (e.g., a property with particular allowable values or a category of component with metadata useful for characterizing it), operations (e.g., a workflow to set particular properties that in some cases could link to workflows defined by other associated groups), permissions (e.g., steps in a defined workflow that can only be performed by certain roles defined in the group and thus by participants in the group assigned to those roles), displays (e.g. a particular view that checks whether particular types of components in a product have particular property values and visually highlights whether or not each component passes the check), etc., all of which may be linked to different components/subcomponents/products and may lead to explicit links between groups and participants. Such complex and intertwined relationships and information flows between and among different participants may all be managed under the coherent framework 800 supported by the service engine 860 based on needs and specifications in an unfragmented manner.

As discussed herein, accessing/viewing/manipulating/distributing information in a LIC representing a component/subcomponent/project/product may be achieved using different information management tools made available through the LIC, either embedded in the LIC or externally linked to the LIC (see FIG. 6). Such information management tools in a LIC made available in its Work Space 630 (see FIG. 6) may be invoked by participants to perform corresponding tasks on information stored in the LIC. Information management tools embedded in various LICs may reside centrally in the service engine 860 at layer 1210. Tools to be embedded within a certain LIC may be referenced from the Work Space 630 of the LIC that links to the tool centrally stored and managed by the service engine 860. Once invoked by a participant of a specific LIC, the tool may be customized or instantiated by the access mechanism 1210 to retrieve control information associated with the participant with respect to the LIC from the Control Space 620 (or at layers 930, 940, or 950) in order to instantiate a version of the tool that can operate specifically for the participant with respect to the particular LIC in order to perform the requested operation in accordance with the scope of rights set up for the participant with respect to the LIC.

The access mechanism 1210 may also operate in conjunction with a version control mechanism 1220 in order to enforce version control, as shown in FIG. 12. The version control mechanism 1220 may interface with a user, a group, or a project to create versions and provide information to enable proper version control on documents related to components/subcomponents and their usages in different components/products/projects. Users, groups, and projects/products may interface with the components/subcomponents layer and information may flow bi-directionally in each of the established communication channels.

Figure 13:
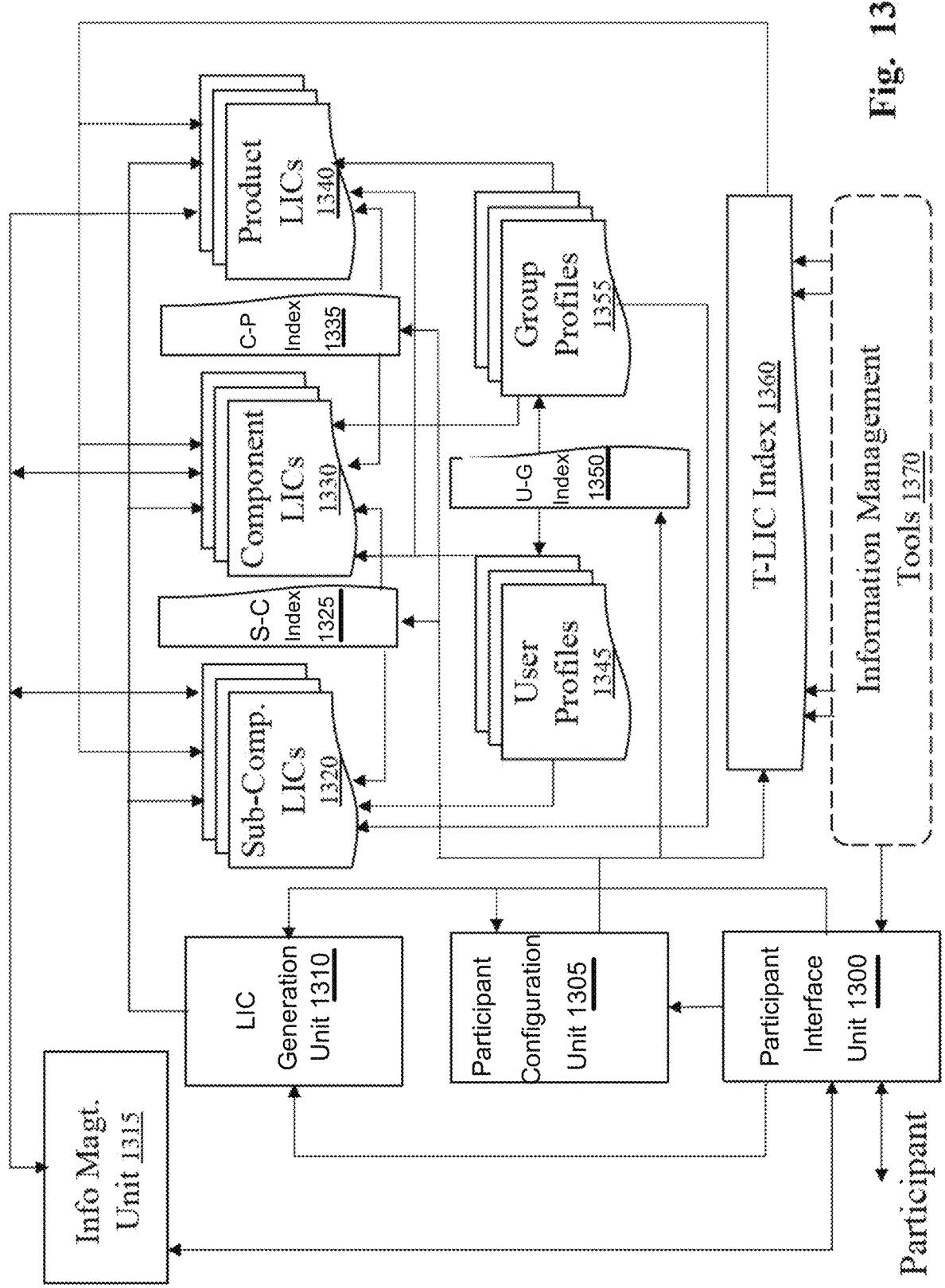
FIG. 13 depicts at least some of functional blocks and data thereof of a service engine, in accordance with an exemplary embodiment of the present teaching.

FIG. 13 depicts at least some of the functional blocks and data that they manage in the service engine 860, in accordance with an exemplary embodiment of the present teaching. To handle requests from participants in the framework as shown in FIG. 12, the service engine 860 may include a number of functional blocks that handle various requests from participants to provide what is requested. In the illustrated exemplary embodiments, the service engine 860 comprises a participant interface unit 1300 for interacting with a participant to receiving requests and returning what is requested, a participant configuration unit 1305 for creating profiles for users/groups and necessary information management constraints in the Control Space of a LIC, a LIC generation unit 1310 for creating a LIC and configuring the LIC based on instructions, and an information management unit 1315 for carrying out a request from a participant to perform tasks on managing information residing in the Document Space 610 of a LIC using some tools available in the Work Space of the LIC (or hooked to the LIC via some external connection) under the constraints specified in the Control Space 620 of the LIC.

There also include various data, files, archives, and records that are created in response to or to support the operations of the functional blocks 1305, 1310, and 1315. For example, in some embodiments, although all LICs may be variously used as subcomponent LICs, component LICs, or product LICs depending on the user/group accessing them and context (e.g., a wing component may be a product sold as standalone item or a subcomponent of a drone), they may be accessed and indexed as belonging to different categories based on each specific request for a LIC by a participant. For instance, there are subcomponent LICs 1320 and component LICs 1330 created in response to and based on instructions provided by participants who, e.g., are developers of the underlying subcomponents and components. Similarly, there are product LICs 1340, representing products, that may be created based on instructions from participants who produce the products by integrating components or subcomponents of other participants of the framework 800 and represent integrated products. Subcomponents, components, and products may be cross referenced or linked among subcomponent LICs, component LICs, and product LICs based on the relationships among them. Such cross references or linkages may be used to represent the composition relationships between and among LICs and may be achieved via various index files such as S-C index file 1325 (representing the linkage relationships between subcomponents and components), C-P index file 1335 (representing the linkage relationships between components and products). Similarly, composition relationships between subcomponents and products may also be represented by a S-P index file (not shown).

For example, a drone as a product may use different components in its design such as cameras, wings, and motors so that the LIC representing the drone product may provide links to component LICs representing the cameras, wings, and motors used. In some embodiments, this linkage may be implemented via the C-P index file 1335, which includes indices linking the drone product LIC to the appropriate component LICs for cameras, wings, and motors. Similarly, if a motor used by the drone product uses subcomponents for its construction, the corresponding motor LIC may also link it to LICs representing such subcomponents and this may be achieved by providing indices in the S-C index file 1325 that indexes the LIC of a motor used by the drone product to various LICs representing the subcomponents used in the motor.

The service engine 860 may also include participant profiles that store various types of information about the participants, their relationship with others (e.g., group), authorities or restrictions associated with their abilities with respect to different LICs, etc. Such profiles are used to control participants' activities on LICs and can be represented as, e.g., user profiles 1345 (e.g., for individual participants) and group profiles 1355 (e.g., for groups of users who are bind together in a group profile for a common activity they are participating such as a project or a product development). There may be cross references between user profiles 1345 and group profiles 1355 based on their organizational relationships and such cross references may be achieved via a U-G index file 1350 that is capable of modeling any grouping configurations. Via this index file 1350, a user may participate in different groups and a group may include an arbitrary number of users.

In some embodiments, on each link between a user and a group, attributes may be assigned to the link that may specify, e.g., the role of the user in that group, spatial restrictions on what this user may access based on his/her role (e.g., an accountant in a group for developing a product is allowed to access only finance-related information and is restricted from accessing technical information about the product), and temporal restrictions (e.g., marketing personnel included in the group for the product development are not allowed to access documents describing the functionality metrics until the technical personnel in the same group indicate that the product has been tested and the document on its metrics has been completed). A group profile may also be specified to have an overall restriction imposed on all members. For example, if a group is formed for developing a product that uses components provided by others and LICs of these components are linked to the LIC for the product, the group may be allowed to access marketing materials in these linked component LICs but not be allowed to access the documents in these component LICs on specific technical designs. Such a restriction is applicable to all members of the group.

The user profiles 1345 and group profiles 1355 may serve as control-related configurations. Individual files at either the user level or the group level associated with participants of any LIC (e.g., a component LIC defines participants that are allowed to access the information stored therein) may be referenced or linked to the LIC so that they can be used, whenever needed, to perform access control by the LIC. This is illustrated in FIG. 13, where the user profiles are connected to 1320, 130, and 1340 and so are the group profiles 1355.

As shown in FIG. 13, there are also information management tools 1370 that may be used as embedded tools 630-1 (see FIG. 6) in different LICs by reference. This may be achieved via a T-LIC index file 1360, through which any LIC (whether in 1320, 1330, or in 1340) may link to any tool in 1370 as its embedded tool and made available for the participants of the LIC to utilize the tool to manage the information stored in the LIC or linked by the LIC. While the tools deposited in the information management tools 1370 can be referenced by any LIC, each LIC may use the tool in a manner appropriate in accordance with the permissible rights granted to the LIC. That is, each tool from the information management tool pool 1370 needs to be instantiated for each LIC that uses the tool based on the specific set up for that LIC.

Figure 14:
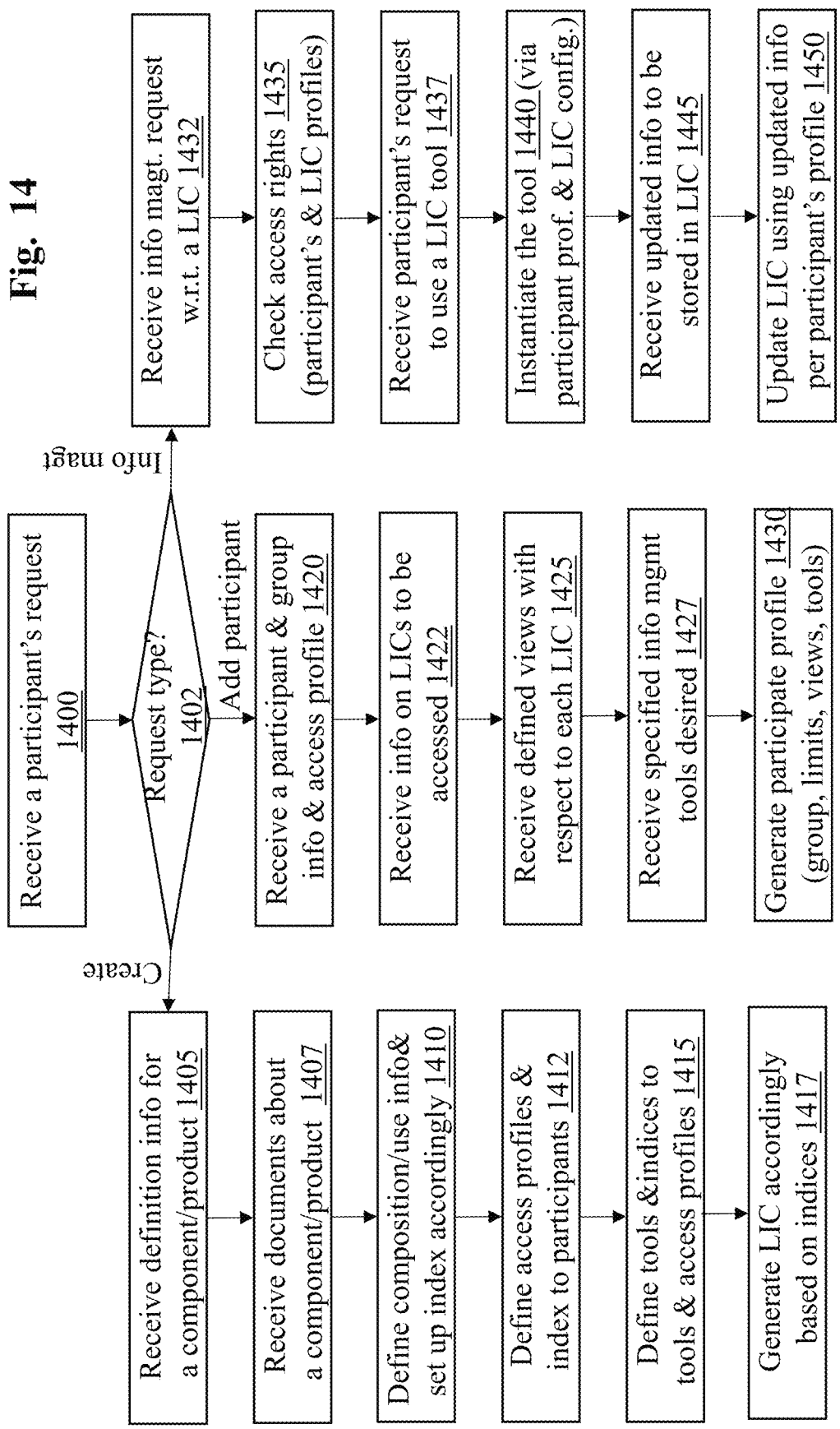
FIG. 14 is a flowchart of an exemplary process of a service engine, in accordance with an exemplary embodiment of the present teaching.

FIG. 14 is a flowchart of an exemplary process of the service engine 860, in accordance with an exemplary embodiment of the present teaching. Upon receiving a request at 1400 from a participant by the participant interface unit 1300, the nature of the request is determined at 1402. If the request is for creating a LIC, the processing goes through steps 1405-1417. To create a LIC, whether it is for a project/product, a component, or a subcomponent, information that defines different aspects of the underlying product/component/subcomponent the LIC represents may be first received at 1405. Documents (data, files, metadata, etc.) related to the product/component/subcomponent are received, at 1407, from the participant. In some situations, additional information about the composition of the product/component may be provided, at 1410, by the participant, which may be used to set up, at 1410, different indices that point/link to other LICs representing the components/subcomponents that compose the product/component. For each LIC being created, the creator (the requesting participant) may also define, at 1412, which participants (individual users or groups) have access to the LIC with corresponding rights defined with respect to, e.g., access, manipulation, and distribution. In addition, for each LIC, the creator may also define and set up, at 1415, embedded tools to be made available to participants of the LIC so that they can invoke such tools to carry out information management tasks as applied to the LIC and optionally its connected LICs. With information related to the underlying product/component/subcomponent provided, control configurations defined, and embedded tools set up for the LIC, the LIC generation unit 1310 then generates, at 1417, the LIC.

If the request received at 1400 is for specifying a participant, the processing goes through steps 1420-1430. This type of operation may be requested by a creator of an LIC (to set up who can access the LIC when creating the LIC), a participant that manages a group (e.g., to add a group member), or an individual user who desires to access information in the LIC. Upon receiving, at 1420, information about a participant to be added and/or a group to which the participant belongs, relevant profiles (of the participant to be added and/or of the group) are accessed and information about the LIC(s) that the new participant desires to access is obtained at 1422. Based on such information, the profile of the newly added participant for the LIC and optionally the profile of the group to which the new participant belongs are indexed against the LIC to implement the permission that allows the new participant to be one of the authorized participants of the LIC.

As discussed herein, each participant of a LIC can define his or her own view(s) of the information from the LIC. Such views may be set up in certain ways (e.g., only displaying certain parts of the information residing in the LIC) due to the access restrictions, the device platform used by the participant to access information in the LIC, or simply because that is the way that the participant prefers to view the information. The instructions on configuration defining the view(s) the new participant desires are received from the requester at 1425. In addition, restrictions may also be placed on the new participant on what tools available at LIC should be made accessible to the new participant and such specification is received at 1427. All the instructions received to define access rights, views, and tools are then used, at 1430, to set up the profile of the new participant. Once set up, the profile for the new participant with various types of information (e.g., which group he or she belongs, what is the limitations to be imposed, how information is to be viewed or displayed, or which tools can be invoked by the participant, etc.) may be linked to the LIC so that the access rights of the participant may be managed accordingly.

If the request received at 1400 is to perform an information management task with respect to a LIC, the processing goes through steps 1432-1450. Information on which LIC is to be accessed is received at 1432, based on which configurations associated with the LIC on various participants are accessed and checked at 1435. If the participant is permitted to carry out tasks on LIC, additional information is received, at 1437, from the requester on which tools in the LIC are to be invoked to perform the tasks. As discussed herein, each tool, when invoked by a participant associated with a LIC, is to be instantiated based on the scope of rights assigned to the participant and certain configurations associated with the LIC so that an instantiation of the tool is generated with respect to the requesting participant within the confines of the LIC. The instantiation of the requested tool is performed at 1440. If the operation to be performed by the participant on some information of the LIC yields result, updated information (e.g., resulted from the application of the instantiated tool on data residing in the LIC) may be produced and may need to be used to update the information in the LIC. In this case, when the updated information is received, at 1445, it is used to update, at 1450, the LIC according to the access rights provided to the participant based on the profile of the participant.

Figure 15:
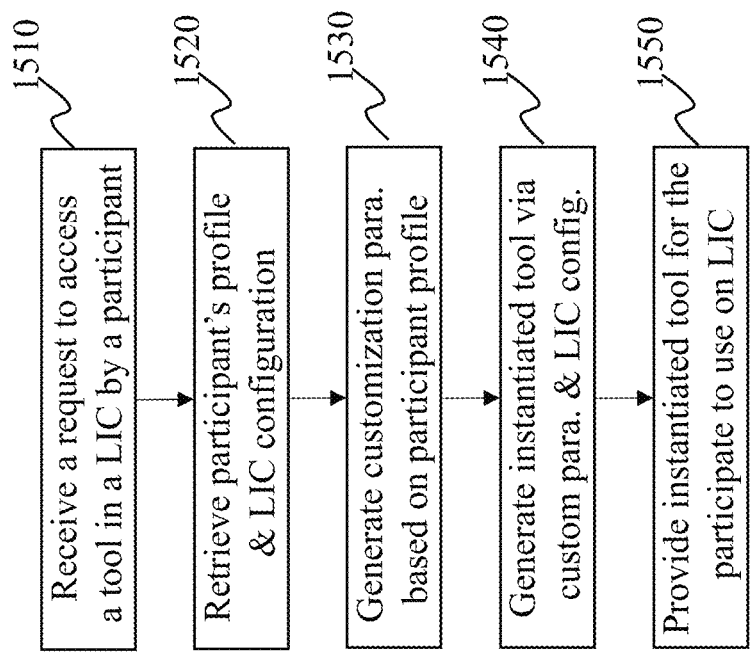
FIG. 15 is a flowchart of an exemplary process of invoking an information management tool in a LIC via a service engine, in accordance with an exemplary embodiment of the present teaching.

FIG. 15 is a flowchart of an exemplary process of generating an instantiation of an information management tool in a LIC invoked by a participant of the LIC, in accordance with an exemplary embodiment of the present teaching. This process is a more detailed flow of steps for step 1440 in FIG. 14. When a request is received, at 1510, from a participant to use a tool embedded in an LIC to perform a task, a profile of the participant and relevant configurations of the LIC are retrieved at 1520 and used to generate, at 1530, customization parameters to be used to instantiate the tool. Such parameters are generated to enforce the rights granted to and restrictions to be imposed on the participant in terms of his or her use of the embedded tool and thus are used to generate, at 1540, an instantiated tool. Once generated, the instantiated tool is then made available, at 1550, to the participant to perform the tasks desired.

Figure 16:
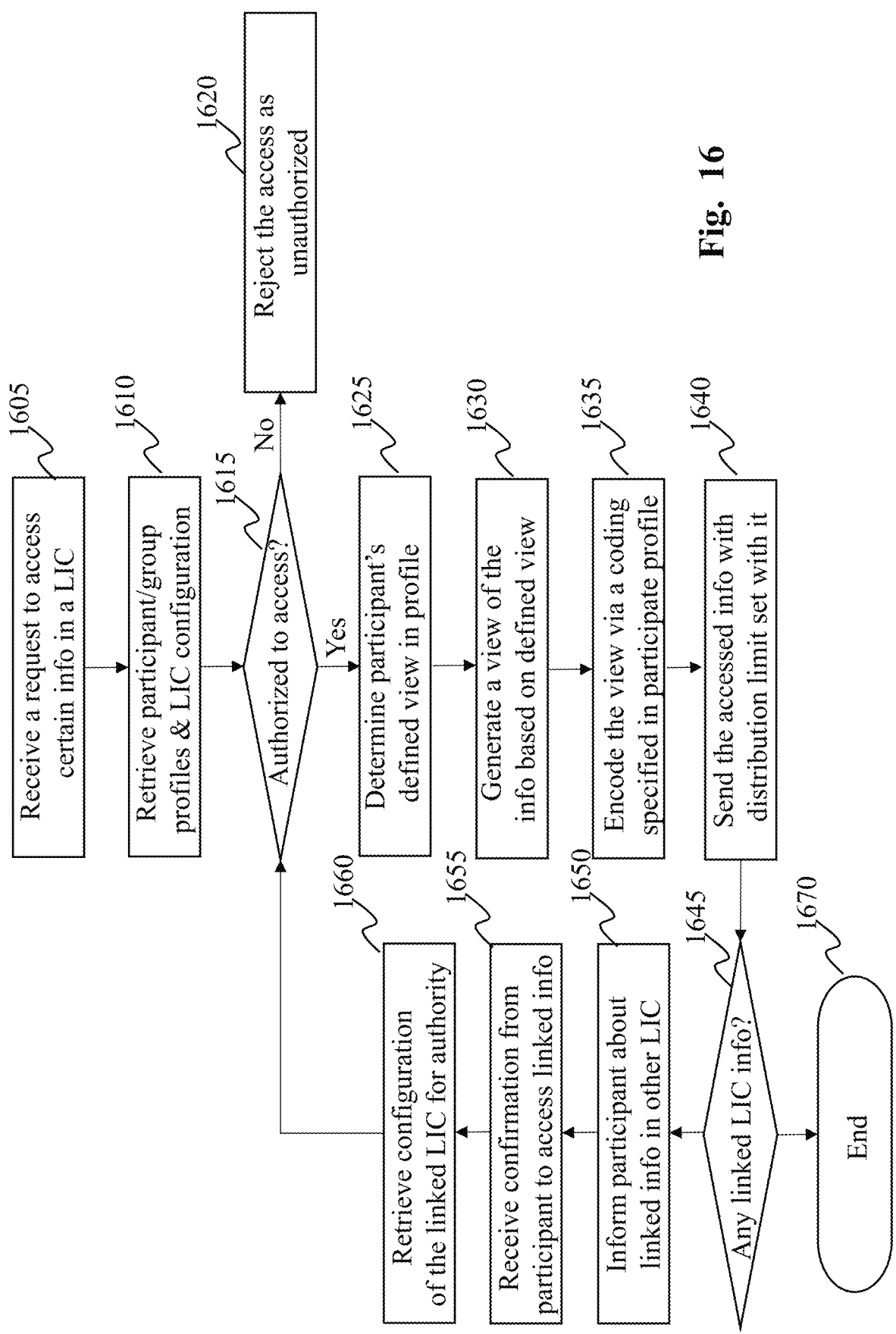
FIG. 16 is a flowchart of an exemplary process of accessing information from a LIC via a service engine, in accordance with an exemplary embodiment of the present teaching.

FIG. 16 is a flowchart of an exemplary process of accessing information from a LIC via the information management unit 1315, in accordance with an exemplary embodiment of the present teaching. As discussed herein, accessing information residing in a LIC is controlled based on access rights configured. In addition, a LIC may be linked to other LICs to form an information access chain which a user to follow to obtain unfragmented information even though such information is separately stored in different LICs (distributed or segregated). When a request to access certain information in a LIC is received at 1605, profiles of the participant requesting the access as well as the configuration of the LIC are retrieved at 1610 for enforcing access control.

If the participant is not permitted to access the requested information from the LIC, the request is rejected at 1620. If the participant is permitted to access the information (e.g., based on the profile of the participant), it is determined, at 1625, what is the view or display that the participant defined, which is then used to generate, 1630, a view/display of the information the participant requested to access. In some embodiments, the participant may have previously specified the coding scheme to encrypt the information and if that is the case, the information accessed is encoded, at 1635, using the coding scheme specified by the participant, and sent, at 1640, to the participant with, optionally, distribution restrictions embedded therein to enforce the limitations.

In some situations, information stored in a LIC may link to other LICs for either more detailed or additional relevant information. For example, a camera component used in a drone product represented by a first LIC may be linked to a number of other LICs representing, e.g., the camera component represented by a second LIC, which are subsequently linked to a third and a fourth LIC representing, respectively, a lens subcomponent used to make the camera and an electronic imaging device also used in the camera. When a participant of the drone product LIC accesses camera information residing in the first LIC for the drone, the participant is able to follow a linkage linking the participant to the second LIC for camera, from where the participant may also be able to follow the linkage therein to access information about the lens and imaging device stored in the third and fourth LICs.

Thus, after sending the information from the LIC to the participant at 1640, it may be checked, at 1645, whether there is any linked LIC. If there is no linkage, the process ends at 1670. If there is a linkage to another LIC, the participant is informed at 1650. If the participant confirms to desire to access information in the linked LIC, confirmed at 1655, the access restrictions of the linked LIC may be retrieved and used to enforce access control. If the access is authorized, determined at 1615, the process continues as discussed herein. If there are multiple layers of linkage, the process as disclosed herein allows the participant to follow the linkages in various LICs to access information stored in multiple linked LICs.

Figure 17:
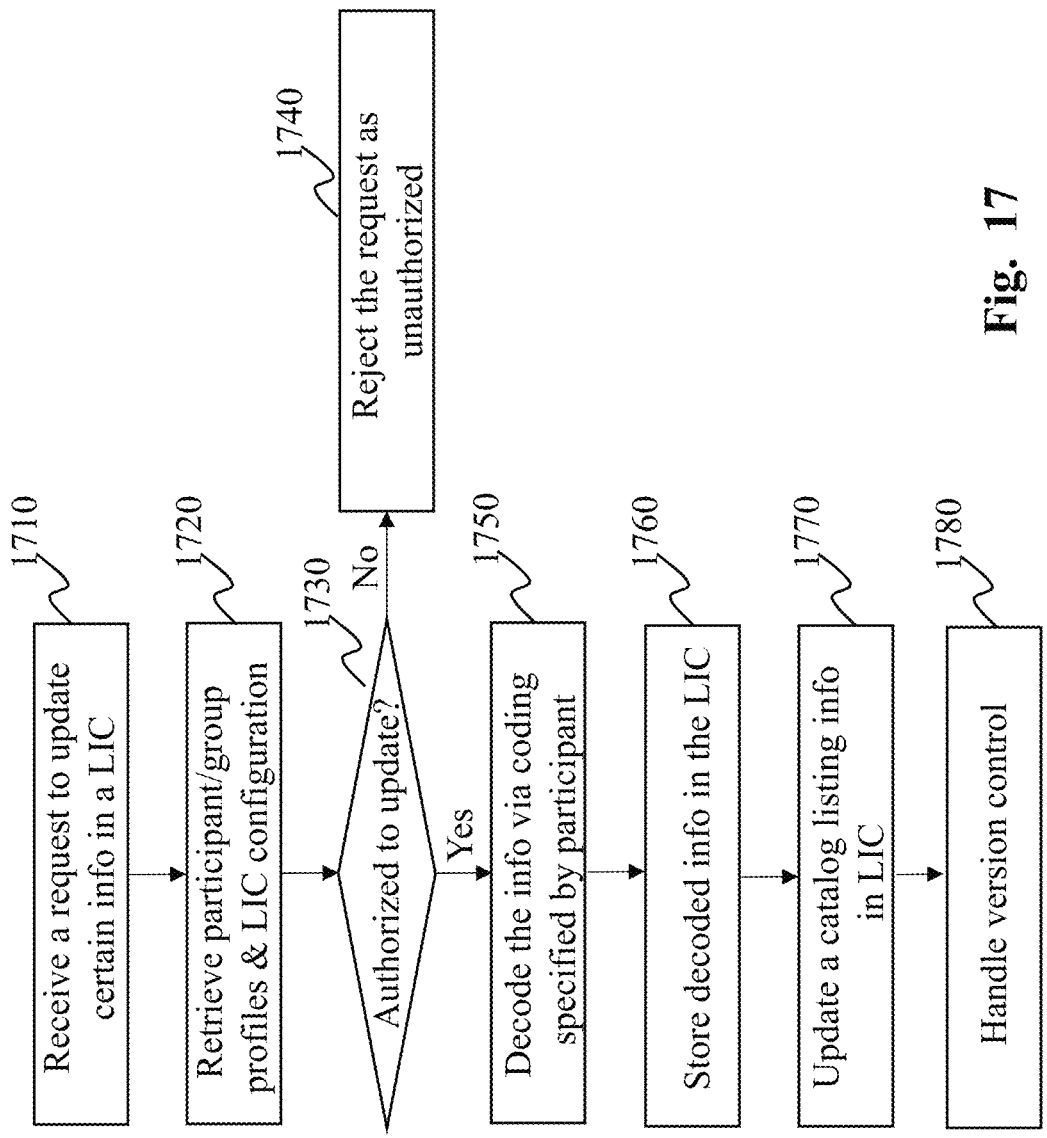
FIG. 17 is a flowchart of an exemplary process of updating information in a LIC via a service engine, in accordance with an exemplary embodiment of the present teaching.

FIG. 17 is a flowchart of an exemplary process of updating information in a LIC via the information management unit 1315, in accordance with an exemplary embodiment of the present teaching. As discussed herein, information access includes retrieval and update. This flowchart is directed to the process of updating or modifying information stored in a LIC. A request is received, at 1710, from a participant to update certain information in a LIC. A request to update information in a LIC may be due to different reasons. For example, a participant may have previously retrieved some information from the LIC and then modified the content of the information and now wants to save the modified version of the information back in the LIC. Another situation related to update is when new information becomes available. For instance, a participant of a LIC may access some design parameters of a component represented by the LIC and run some simulations which yielded data that may characterize the features of the component. At this point, the participant may desire to store the simulation result and a report thereof (both newly generated) back in the LIC. In such situations, the participant requests to update the LIC with certain information from the participant for the update.

To fulfill the update operation, the information management unit 1315 proceeds to ensure that the requested update operation is within the access rights vested in the participant. To do so, control information related to the participant and the specific LIC to be updated is retrieved at 1720, which may include the profile for the participant or may be the profile of the group to which the participant belongs, optionally as well as the configuration of the LIC, and used to determine, at 1730, whether the requested update operation is authorized. If the requested operation is not authorized, the requested is rejected at 1740. There may be different reasons for the rejection. For instance, the participant may not have the right to update the LIC, either categorically not allowed or not allowed on the information to be updated. It is also possible that the LIC configuration does not allow for updates.

If the requested update operation is permitted, the received information from the participant (to be used to perform the update) may optionally be decoded, at 1750, in accordance with the coding scheme previously defined by the participant. Such decoded information is then stored, at 1760, in the LIC to accomplish the update. In the situation that the updated information is new (i.e., previously does not exist), a catalog listing what is available in the LIC may be optionally updated at 1770 accordingly. If the updated content is a modified version of some previously stored content, the new version may be stored as a different version of the old content and version control may be performed at 1780 so that both old and new versions of the content are both existing and accessible.

Figure 18:
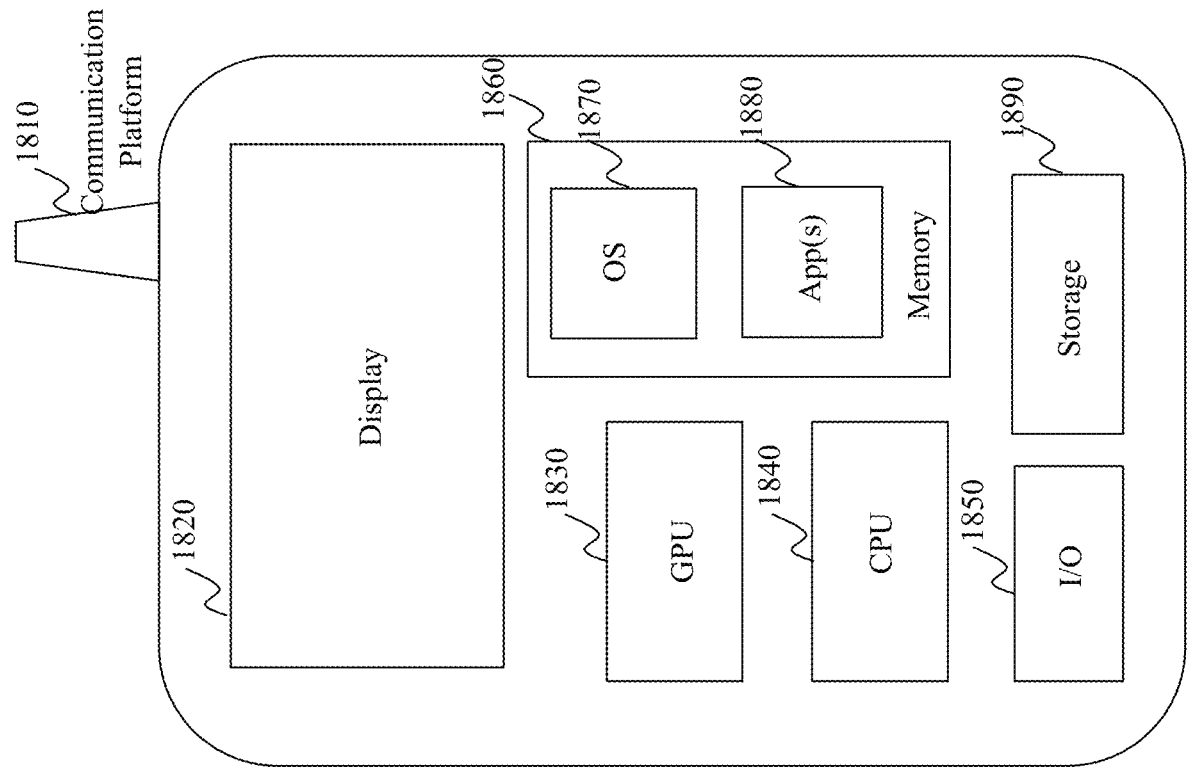
FIG. 18 is an illustrative diagram of an exemplary mobile device architecture that may be used to realize a specialized system implementing the present teaching in accordance with various embodiments.

FIG. 18 is an illustrative diagram of an exemplary mobile device architecture that may be used to realize a specialized system implementing the present teaching in accordance with various embodiments. In this example, the user device on which the present teaching may be implemented corresponds to a mobile device 1800, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1800 may include one or more central processing units ("CPUs") 1840, one or more graphic processing units ("GPUs") 1830, a display 1820, a memory 1860, a communication platform 1810, such as a wireless communication module, storage 1890, and one or more input/output (I/O) devices 1840. Any other suitable component, including but not limited to a system bus or a controller (not shown), may also be included in the mobile device 1800. As shown in FIG. 18, a mobile operating system 1870 (e.g., iOS, Android, Windows Phone, etc.), and one or more applications 1880 may be loaded into memory 1860 from storage 1890 in order to be executed by the CPU 1840. The applications 1880 may include a browser or any other suitable mobile apps for information management according to the present teaching on mobile device 1800. User interactions, if any, may be achieved via the I/O devices 1840 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 19 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 800 may be used to implement any component or aspect of the framework as disclosed herein. For example, the learning system as disclosed herein may be implemented on a computer such as computer 1900, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1900, for example, includes COM ports 1950 connected to and from a network connected thereto to facilitate data communications. Computer 1900 also includes a central processing unit (CPU) 1920, in the form of one or more processors, for executing program instructions. The exemplary computer platform includes an internal communication bus 1910, program storage and data storage of different forms (e.g., disk 1970, read only memory (ROM) 1930, or random access memory (RAM) 1940), for various data files to be processed and/or communicated by computer 1900, as well as possibly program instructions to be executed by CPU 1920. Computer 1900 also includes an I/O component 1960, supporting input/output flows between the computer and other components therein such as user interface elements 1980. Computer 1900 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:
1. A live information construct (LIC) representing a component for facilitating unfragmented management of information associated with the component, comprising:
 a document space with a plurality of documents representing information about a plurality of aspects of the component in an unfragmented manner, including a server for storing the information;
 a control space having a plurality of control configurations, each of which defines at least one communication channel used by a party to manage relevant information in the document space related to at least some of the plurality of aspects of the component and specifies limitations of access rights and manipulation rights to be imposed on the at least one communication channel, the communications channel configured to:
  receive a request for an information management task from a participant:
  examine the scope of rights assigned to the participant; and
  based on the scope of rights assigned to the participant, instantiate a tool for performing the management task; and
 a work space with a plurality of embedded tools that can be invoked by a party to manage the relevant information in the LIC via the at least one communication channel within the confine of the limitations.

2. The LIC of claim 1, wherein the party includes a developer, a user, a tester, a buyer, a potential buyer, a seller, a potential seller, a marketer, a financer, a supplier, an integrator, and a participant associated with any of the above related to the component.

3. The LIC of claim 1, wherein the plurality of documents include textual, visual, acoustic, linkage, and multimedia information.

4. The LIC of claim 1, wherein the plurality of aspects of the component include at least some of:
   one or more designs and compositions of the component;
   at least one parameter of the component; characteristics of the component;
   operational configuration information of the component; test setup criteria associated with the component;
   performance of the component measured with respect to operational conditions and/or metrics thereof; and
   usages of the component.

5. The LIC of claim 1, wherein the plurality of control configurations include at least one of:
   one or more access control configurations to be used to control how each of the plurality of documents is to be accessed by different parties via their respective communication channels with access rights defined therefor;
   one or more manipulation control configurations to be used to control how each of the plurality of documents is to be manipulated by different parties; and
   one or more distribution configurations to be used to control how each of the plurality of document is to be distributed by different parties.

6. The LIC of claim 1, wherein management of relevant information in the document space includes at least one of creating, storing, loading, retrieving, updating, manipulating, analyzing, simulating, and distributing of any of the relevant information.

7. The LIC of claim 1, wherein the limitations to be imposed on the at least one communication channel associated with the party relate to distribution rights.

8. The LIC of claim 1, wherein the embedded tools in the work space include at least one of administrative tools, access tools, presentation tools, connection tools, analytic tools, and coding tools.

9. The LIC of claim 8, wherein the presentation tools include at least one of publishing tools and viewing tools.

10. The LIC of claim 8, wherein the connection tools include at least one of linking tools, composition connectors, and composition receptors.

11. The LIC of claim 8, wherein the analytic tools include at least one of simulation tools and machine learning tools.

12. The LIC of claim 1 wherein the manipulation rights define an ability to access and distribute information in the doc space.

13. A method implemented on at least one processor, a memory, and a communication platform capable of connecting to a network for managing information in an unfragmented manner, comprising:
   generating a live information construct (LIC) for one of a plurality of components, wherein the LIC comprises:
   a document space with a plurality of documents representing a plurality aspects of the component,
   a control space with a plurality of control configurations, each of which defines at least one communication channel used by a party to manage information in the document space with limitations of access rights and manipulation rights imposed on the at least one communication channel, the communications channel configured for
      receiving a request for an information management task from a participant;
      examining the scope of rights assigned to the participant; and
      based on the scope of rights assigned to the participant, instantiating a tool for performing the management task; and
   a work space with a plurality of embedded tools for managing information in the LIC via communication channels associated with different parties;
   receiving a request from a requesting party for invoking one of the plurality of embedded tools in the LIC to manage information in the LIC; and
   in response to the request, activating the invoked tool in an instantiated form, wherein the instantiation is based on a control configuration associated with the requesting party with one or more limitations that the invoked tool is to comply.

14. The method of claim 13, wherein the party includes a developer, a user, a tester, a buyer, a potential buyer, a seller, a potential seller, a marketer, a financer, a supplier, an integrator, and a participant associated with any of the above related to the component.

15. The method of claim 13, wherein the plurality of documents include textual, visual, acoustic, linkage, and multimedia information.

16. The method of claim 13, wherein the plurality of aspects of the component include at least some of:
   one or more designs and compositions of the component;
   at least one parameter of the component; characteristics of the component; operational configuration information of the component; test setup criteria associated with the component;
   performance of the component measured with respect to operational conditions and/or metrics thereof; and
   usages of the component.

17. The method of claim 13, wherein the plurality of control configurations include at least one of:
   one or more access control configurations to be used to control how each of the plurality of documents is to be accessed by different parties via their respective communication channels with access rights defined therefor;
   one or more manipulation control configurations to be used to control how each of the plurality of documents is to be manipulated by different parties; and
   one or more distribution configurations to be used to control how each of the plurality of document is to be distributed by different parties.

18. The method of claim 13, wherein management of relevant information in the document space includes at least one of creating, storing, loading, retrieving, updating, manipulating, analyzing, simulating, and distributing of any of the relevant information.

19. The method of claim 13, wherein the embedded tools in the work space include at least one of administrative tools, access tools, presentation tools, connection tools, analytic tools, and coding tools.

20. The method of claim 19, wherein the presentation tools include at least one of publishing tools and viewing tools through which a party defines a customized view of the information from the LIC.

21. The method of claim 19, wherein the connection tools include at least one of linking tools, composition connectors, and composition receptors.

22. The method of claim 19, wherein the analytic tools include at least one of simulation tools and machine learning tools.

23. Machine readable and non-transitory medium having data stored thereon for managing information in an unfragmented manner, wherein the data, once read by the machine, causes the machine to perform the following:

generating a live information construct (LIC) for one of a plurality of components, wherein the LIC comprises a document space with a plurality of documents representing a plurality aspects of the component, a control space with a plurality of control configurations, each of which defines at least one communication channel used by a party to manage information in the document space with limitations of access rights and manipulation rights imposed on the at least one communication channel, the communications channel configured to:

receive a request for an information management task from a participant;

examine the scope of rights assigned to the participant; and based on the scope of rights assigned to the participant, instantiate a tool for performing the management task; and a work space with a plurality of embedded tools for managing information in the LIC via communication channels associated with different parties;

receiving a request from a requesting party for invoking one of the plurality of embedded tools in the LIC to manage information in the LIC; and in response to the request, activating the invoked tool in an instantiated form, wherein the instantiation is based on a control configuration associated with the requesting party with one or more limitations that the invoked tool is to comply.

\* \* \* \* \*